United States Patent
Baba et al.

(10) Patent No.: US 6,650,966 B1
(45) Date of Patent: Nov. 18, 2003

(54) ROBOT REMOTE CONTROLLING APPARATUS AND ROBOT APPARATUS

(75) Inventors: Katsuyuki Baba, Kitakyushu (JP); Shigeaki Ino, Kitakyushu (JP); Yoichi Takamoto, Kitakyushu (JP)

(73) Assignee: Tmsuk Co., Ltd., Kitakyushu (JP)

( * ) Notice: Subject to any disclaimer, the term of this patent is extended or adjusted under 35 U.S.C. 154(b) by 0 days.

(21) Appl. No.: 10/136,532

(22) Filed: May 2, 2002

(51) Int. Cl.$^7$ .............................................. G06F 19/00
(52) U.S. Cl. ...................... 700/245; 700/262; 700/264; 318/567; 318/568.12; 345/161; 345/156; 600/595
(58) Field of Search ................................ 700/245, 263, 700/264; 318/567, 568.12; 345/161, 156; 388/128; 400/2, 489, 682, 715; 446/327, 328, 329, 330; 414/5; 600/595

(56) References Cited

U.S. PATENT DOCUMENTS

| | | | | |
|---|---|---|---|---|
| 5,137,384 A | * | 8/1992 | Spencer et al. | 400/489 |
| 5,912,658 A | * | 6/1999 | Bergamasco et al. | 345/156 |
| 6,016,385 A | * | 1/2000 | Yee et al. | 700/245 |
| 6,232,735 B1 | * | 5/2001 | Baba et al. | 318/567 |

FOREIGN PATENT DOCUMENTS

JP          6-3465          1/1994

OTHER PUBLICATIONS

Hasunuma et al., Development of teleoperation master system with a kinesthetic sensation of presence, 1999, Internet, pp. 1–7.*

Tachi, Real–time remote robotics—Toward networked telexistence, IEEE, Computer graphics and applications, vol. 18, No. 6, pp. 6–9.*

Hirai et al. The development of Honda humanoid robot, 1998, IEEE, pp. 1321–1326.*

TNCS Scientific Atlanta, TNCS Bundled Computer/Software Packages, 2001, Internet, pp. 1–5.*

* cited by examiner

Primary Examiner—William A. Cuchlinski, Jr.
Assistant Examiner—McDieunel Marc
(74) Attorney, Agent, or Firm—Oblon, Spivak, McClelland, Maier & Neustadt, P.C.

(57) ABSTRACT

The invention has an object to provide a robot remote controlling apparatus that can easily and comfortably carry out operations at the finger portion operating portion and arm portion operating portion and can easily and comfortably carry out operations at other parts than at the above-described operating portions. The robot remote controlling apparatus includes a rack 30 that accommodates said computer apparatus excluding a display 24 and an input device 28, and at the same time, that mounts the display 24; an up and down moving arm 20 that is rotatably disposed on said rack and whose tip end portion 20b can move up and down; a supporting section 10 rotatably disposed on said tip end portion, which detects a turning angle with respect to said tip end portion as a left and right turning angle of a head portion, and detects a turning angle of a roller 14a disposed on the upper surface thereof as an up and down turning angle of the head portion, and in which said input device 28 is disposed at the front side thereof, and said left and right upper limb portion operating portions 11 are disposed at the left and right sides thereof; and an independent box-shaped leg operating section 70 on which said fuselage operating portion is disposed.

9 Claims, 13 Drawing Sheets

(a)

(b)

ROBOT REMOTE CONTROLLING APPARATUS AND ROBOT APPARATUS

DETAILED DESCRIPTION OF THE INVENTION

1. Technical Field of the Invention

The present invention relates to a robot apparatus that handles goods by means of respective parts thereof such as the head portion, arm portion and finger portion, etc., and a robot remote controlling apparatus for remotely controlling the robot apparatus via a mobile communications network such as a PHS line, etc.

2. Prior Arts

Recently, in line with an increase in work by a robot apparatus, importance has been placed on a robot operating apparatus, which provides instructions such as finger movements and arm movements to the robot apparatus.

As a prior art finger portion operating portion that provides movement instructions to the finger portion, there is an input device acting as a data glove that is described in, for example, Japanese Unexamined Patent Publication No. 3465 of 1994. The data glove is such that conductive gel is mounted at the joints of fingers of a glove-shaped input device, and, by utilizing changes in electric resistance values of the conductive gel in line with bending and stretching states of the fingers, bending and stretching actions of fingers of a robot are instructed. Also, as a prior art arm portion operating portion that provides movement instructions to the arm portion, an arm portion structure, whose size is similar to that of an arm portion structure of a human's, is considered to be like an operating portion that carries the same on a shoulder.

However, since, in a prior art finger portion operating portion, the data glove is shaped to be a glove and it is necessary to attach conductive gel, which acts as sensors, to the joints of respective fingers, there occur some problems in that the attaching and detaching thereof is made cumbersome, and fingers perspire in a glove when it is hot, and the sweating makes an operator uncomfortable. Also, there occur other problems in that a structure of the prior art arm portion operating portion is such that the man carries the same on his shoulders, and it is heavy to carry the arm portion operating portion, resulting in a difficulty in operation.

It is requested that the robot remote controlling apparatus can easily and comfortably carry out operations in the finger portion operating portion and arm portion operating portion, and can easily and comfortably carry out operations at other parts than at the above-described operating portions. It is also requested that a robot apparatus that is remotely controlled by the robot remote controlling apparatus is easily remotely controlled and the structure is simple.

In order to meet the above-described requirements, it is therefore an object of the invention to provide a robot remote controlling apparatus that can easily and comfortably carry out operations at the finger portion operating portion and arm portion operating portion and can easily and comfortably carry out operations at other parts than at the above-described operating portions, and a robot apparatus having a simple structure, which is easily and remotely controlled by the above robot remote controlling apparatus.

SUMMARY OF THE INVENTION

In order to solve the problems and other shortcomings, a robot remote controlling apparatus according to the invention includes: a robot operating apparatus including an upper limb portion operating portion for carrying out finger operations and arm operations, a fuselage operating portion for carrying out body operations, travel portion operations, and running operations, and a head portion operating portion for carrying out head operations; a computer apparatus including a display for displaying data, an input device for inputting data, and an operation controlling portion for processing data on the basis of operation data from the robot operating apparatus; and a mobile communications device for transmitting data, which is processed by the computer apparatus, via wireless circuits; and the same comprises: a rack that accommodates the computer apparatus excluding the display and input device, and at the same time, that mounts the display; an up and down moving arm that is rotatably disposed on the rack and whose tip end portion can move up and down; and a supporting section rotatably disposed on the tip end portion, which detects a turning angle with respect to the tip end portion as a left and right turning angle of a head portion, and detects a turning angle of a roller disposed on the upper surface thereof as an up and down turning angle of the head portion, and in which the input device is disposed at the front side thereof, and the left and right upper limb portion operating portions are disposed at the left and right sides thereof, and an independent box-shaped leg operating section on which the fuselage operating portion is disposed.

Thereby, it is possible to obtain a robot remote controlling apparatus that can easily and comfortably carry out operations at the finger portion operating portion and arm portion operating portion, and can easily and comfortably carry out operations at other parts than at the above-described portions.

Also, in order to solve the above-described problems and shortcomings, a robot apparatus according to the invention is a robot apparatus for driving respective parts of the robot upon receiving, via a base station and a public communications network, the transmission data from the robot remote controlling apparatus that is composed of a robot operating apparatus for operating the respective parts of the robot, an operation side computer apparatus that processes data on the basis of operation data from the robot operating apparatus, and an operation side mobile communications unit for transmitting data, which is processed by the computer apparatus, via a wireless circuit; which is provided with a robot side mobile communications unit for receiving transmission data from the operation side mobile communications unit; a robot side computer apparatus for processing data, which is received by the robot side mobile communications unit, and outputting the operation data; and a robot mechanism portion including respective parts of the robot that are controlled on the basis of the operation data outputted from the robot side computer apparatus.

Thereby, it is possible to obtain a robot apparatus having a simple structure, which can be easily and remotely controlled by the above-described robot remote controlling apparatus.

A robot remote controlling apparatus according to a first aspect of the invention is constructed so that the same includes: a robot operating apparatus including an upper limb portion operating portion for carrying out finger operations and arm operations, a fuselage operating portion for carrying out body operations, travel portion operations, and running operations, and a head portion operating portion for carrying out head operations; a computer apparatus including a display for displaying data, an input device for inputting data, and an operation controlling portion for processing data on the basis of operation data from the robot operating apparatus; and a mobile communications device for transmitting data, which is processed by the computer apparatus, via wireless circuits; and the same comprises: a rack that accommodates the computer apparatus excluding the display and the input device, and at the same time, that mounts the display; an up and down moving arm that is rotatably disposed on the rack and whose tip end portion can move up and down; and a supporting section rotatably disposed on the tip end portion, which detects a turning angle with respect to the tip end portion as a left and right turning angle of a head portion, and detects a turning angle of a roller disposed on the upper surface thereof as an up and down turning angle of the head portion, and in which the input device is disposed at the front side thereof, and the left and right upper limb portion operating portions are disposed at the left and right sides thereof, and an independent box-shaped leg operating section on which the fuselage operating portion is disposed.

With the above-described construction, the upper limb portion operating portion having the finger portion operating portion, arm portion operating portion and head portion up and down operating portion is disposed on the supporting section, wherein it is not necessary for an operator to carry the same on his shoulders. The upper limb portion operating portion can be made small in size and light in weight, and its operation can be made easy and comfortable. Further, it becomes possible to easily carry out the left and right turning operations of the head by turning the supporting section, that is, the upper limb portion operating portion disposed on the supporting section, and by disposing the fuselage operating portion to carry out operations at the body portion and travel portion as an independent operating portion, it becomes possible to carry out the operations at the body portion and travel portion independently from the above operating portions, for example, by operating a leg, wherein such an advantageous effect can be brought about, by which the operations of the body portion and travel portion can be easily and comfortably carried out. Also, since a display is disposed on the rack and an input device is disposed on the supporting section, such an advantageous effect can be brought about, by which visual check of the display and input operations can be made easy.

The robot remote controlling apparatus according to a second aspect of the invention is featured, in addition to the robot remote controlling apparatus described in the first aspect, in that the left and right arm portion operating portions, respectively, include a shoulder forward and backward movement instructing portion for instructing forward and backward movements of a shoulder; a shoulder left and right movement instructing portion for instructing left and right movements of the shoulder; an upper arm instructing portion for instructing rotations of the upper arm, an elbow instructing portion for instructing bending and stretching movements of an elbow; a front arm left and right movement instructing portion for instructing left and right movements of a front arm; and a wrist up and down movement instructing portion for instructing up and down movements of a wrist; left and right finger portion instructing portions respectively include a wrist left and right movement instructing portion for instructing left and right movements of the wrist; first, second and third finger portion instructing portions for instructing bending and stretching movements of the first, second and third fingers, and the head portion operating portion includes a head up and down movement instructing portion for instructing up and down movements of the head portion; and a head left and right movement instructing portion for instructing left and right movements of the head portion.

With the above-described construction, such an advantageous effect can be brought about, by which movement instructions can be provided to the robot apparatus on the basis of operation data that is generated at the arm portion operating portion, finger portion operating portion, and the respective instructing portions such as the head up and down movement instructing portion and head left and right movement instructing portion.

The robot remote controlling apparatus according to a third aspect of the invention is featured, in addition to the robot remote controlling apparatus described in the first or the second aspect, in that the left and right arm portion operating portions, respectively, include a shoulder forward and backward detecting portion for detecting forward and backward movements of a shoulder; a shoulder left and right movement detecting portion for detecting left and right movements of the shoulder; an upper arm detecting portion for detecting rotations of the upper arm, an elbow detecting portion for detecting bending and stretching movements of an elbow; a front arm left and right movement detecting portion for detecting left and right movements of a front arm; and a wrist up and down movement detecting portion for detecting up and down movements of a wrist; the left and right finger portion operating portions, respectively, include a wrist left and right movement detecting portion for detecting left and right movements of the wrist; first, second and third finger portion detecting portions for detecting bending and stretching movements of the first, second and third fingers, and the head portion operating portion includes a head up and down movement detecting portion for detecting up and down movements of the head portion; and a head left and right movement detecting portion for detecting left and right movements of the head portion.

With the above-described construction, such an advantageous effect can be brought about, by which respective amounts of operation can be accurately detected at the respective instruction portions, and the detected data is transmitted to the robot apparatus as the operation data.

The robot remote controlling apparatus according to a fourth aspect of the invention is featured, in addition to the robot remote controlling apparatus described in the third aspect, in that the respective detecting portions include pulleys and timing belts that transmit forward and backward, left and right and turning movements as turning actions, and variable resistors for detecting the turning actions.

With the above-described construction, such an advantageous effect can be brought about, by which the respective amounts of operation can be accurately transmitted to the variable resistors, and accurate operation data can be produced.

The robot remote controlling apparatus according to a fifth aspect of the invention is featured, in addition to the robot remote controlling apparatus described in any one of the first aspect through the fourth aspect, in that the supporting section is provided with a change switch for changing data which is inputted into the display.

With the above-described construction, such an advantageous effect can brought about, by which the displaying contents of the display can be changed to, for example, operation data and image data.

A robot apparatus according to a sixth aspect of the invention is constructed to be a robot apparatus for driving respective parts of the robot upon receiving, via a base station and a public communications network, transmission data from the robot remote controlling apparatus that is composed of a robot operating apparatus for operating the respective parts of the robot, an operation side computer apparatus that processes data on the basis of operation data from the robot operating apparatus, and an operation side mobile communications unit for transmitting data, which is processed by the computer apparatus, via a wireless circuit; and is composed so that the same comprises: a robot side mobile communications unit for receiving transmission data from the operation side mobile communications unit; a robot side computer apparatus for processing data, which is received by the robot side mobile communications unit, and outputting the operation data; and a robot mechanism portion including respective parts of the robot that are controlled on the basis of the operation data outputted from the robot side computer apparatus.

With the above-described construction, the robot mechanism portion has such an advantageous effect by which the same can be easily and remotely controlled on the basis of operation data from the robot side computer apparatus.

The robot apparatus according to a seventh aspect of the invention is featured, in addition to the robot apparatus described in the sixth aspect, in that the robot mechanism portion includes a motor that is driven on the basis of operation data which is outputted from the robot side computer apparatus, and respective parts of the robot that are driven by the motor.

With the above-described construction, such an advantageous effect can be brought about, by which since respective parts of a robot of the robot mechanism portion can be driven by a small-sized and simplified motor, the structure of the robot apparatus itself can be made simple.

The robot apparatus according to an eighth aspect of the invention is featured, in addition to the robot apparatus described in the seventh aspect, in that the respective parts of the robot are a head portion, a body portion, a travel portion, an arm portion and a finger portion.

With the above-described construction, such an advantageous effect can be brought about, by which the robot apparatus itself can be made simple in structure, and at the same time, various types of goods for various uses can be handled.

The robot apparatus according to a ninth aspect of the invention is featured, in addition to the robot apparatus described in the eighth aspect, in that the robot mechanism portion includes a motor, a servo valve, an electric cylinder portion, and a starter motor, which are driven on the basis of operation data outputted from the robot side computer apparatus, and respective parts of the robot, which are driven by the motors, the servo valve, and the electric cylinder portion.

With the above-described construction, such an advantageous effect can be brought about, by which the structure of the robot apparatus itself is simplified, and at the same time, it becomes possible to handle various types of goods for various uses.

The robot apparatus according to a tenth aspect of the invention is featured, in addition to the robot apparatus described in the ninth aspect, in that the respective parts of the robot are a head portion, a body portion for left and right movements, a speed changer, which are driven by the motors, a body portion for up and down movements, an arm portion, a finger portion, which are driven by a hydraulic cylinder via the servo valve, a throttle valve of an engine, a clutch, a brake, and a left and right swiveling portion, which are driven by the electric cylinder, and a flywheel directly connected to an engine crankshaft, which is driven by the starter motor.

With the above-described construction, such an advantageous effect can brought about, by which the structure of the robot apparatus is simplified, and it becomes possible to handle various types of goods for various uses. Furthermore, the construction can bring about such an advantageous effect of displaying sufficient forces (torque) and number of revolutions since the travelling thereof is driven by an engine. Since the respective parts of the robot are driven by hydraulic pressure, wherein, since no oil pressure is employed, the danger of fire can be excluded even if the hydraulic pressure tube is broken, and if water is colored, it is possible to easily locate the breakage point.

EMBODIMENTS OF THE INVENTION

Hereinafter, a description is given of embodiments of the invention with reference to FIG. 1 through FIG. 11.

(Embodiment 1)

Figure 1A:
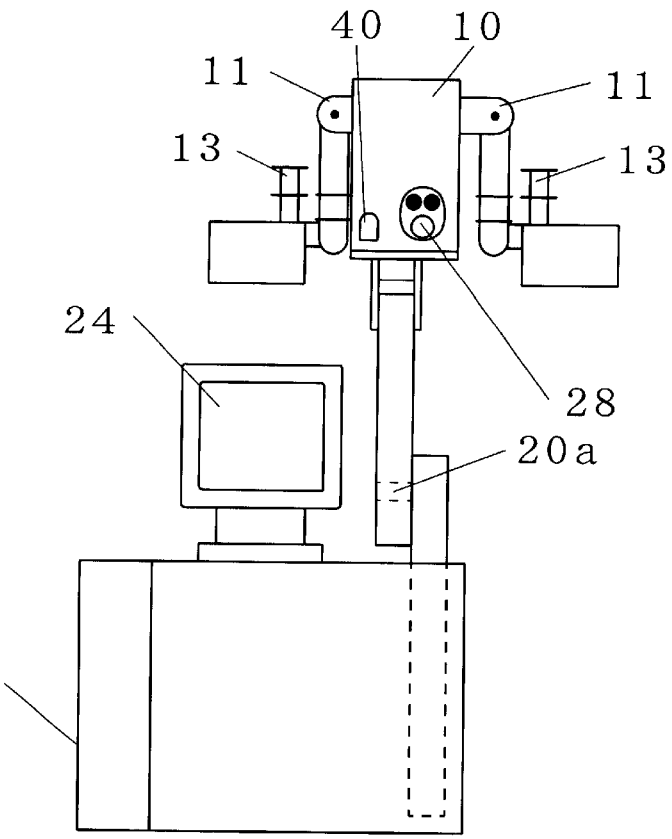
FIG. 1(a) is a front elevational view showing a robot remote controlling apparatus according to a first embodiment of the invention.
Figure 1B:
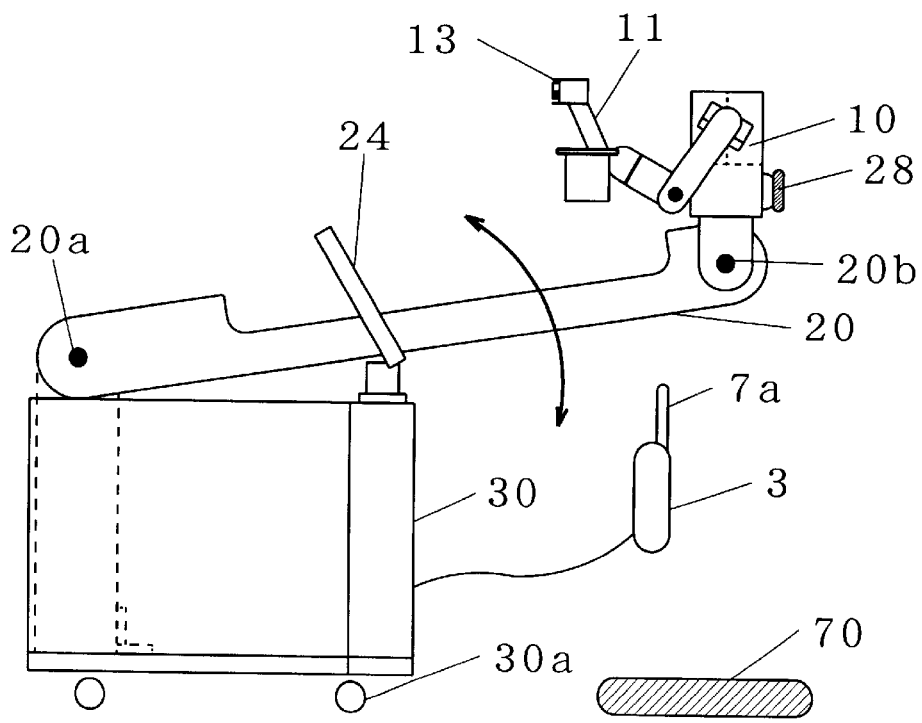
FIG. 1(b) is a left side view showing a robot remote controlling apparatus according to a first embodiment of the invention.

FIG. 1(a) is a front elevational view showing a robot remote controlling apparatus according to the first embodiment of the present invention, and FIG. 1(b) is a left side view showing the robot remote controlling apparatus according to the first embodiment of the invention. In FIG. 1, a mobile communications unit 3 transmits data via a wireless circuit. 7a denotes an antenna. 10 denotes a supporting section. An upper limb portion operating portion 11 carries out finger operations, arm operations and head up and down operations. An up and down moving arm 20 is rotatably disposed on a rack 30 described later, in which the tip end portion 20b thereof moves up and down. 20a denotes the center of rotation of the up and down moving arm. 24 denotes a display for displaying the data. 28 denotes a track ball acting as an input device for inputting data. A rack 30 accommodates a computer apparatus excluding the display 24 and input device 28, and has the display 24 incorporated therein. A change switch 40 changes display on the display 24. A leg operating section 70 has a fuselage operating portion disposed in order to carry out body operations, traveling portion operations and running operations.

Figure 2A:
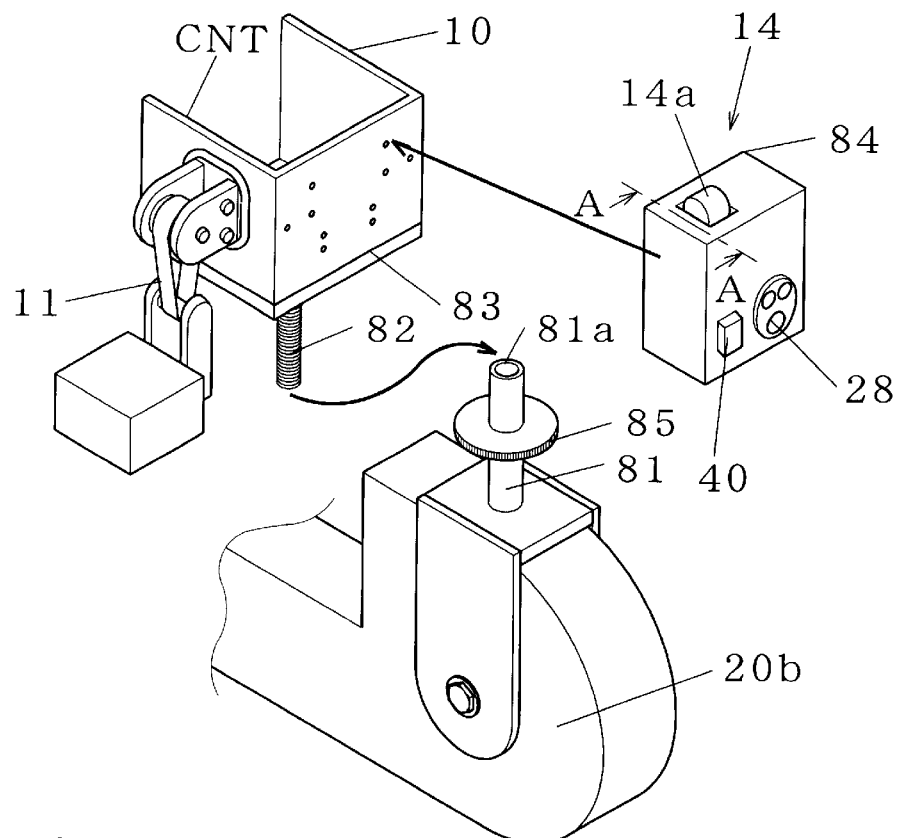
FIG. 2(a) is a disassembled view showing the relationship between the tip end portion of the up and down moving arm and the supporting section.
Figure 2B:
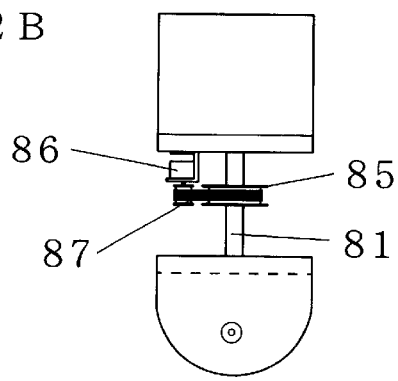
FIG. 2(b) is a configurational view showing a turning angle detector that detects a turning angle of left and right operations of the head portion.
Figure 2C:
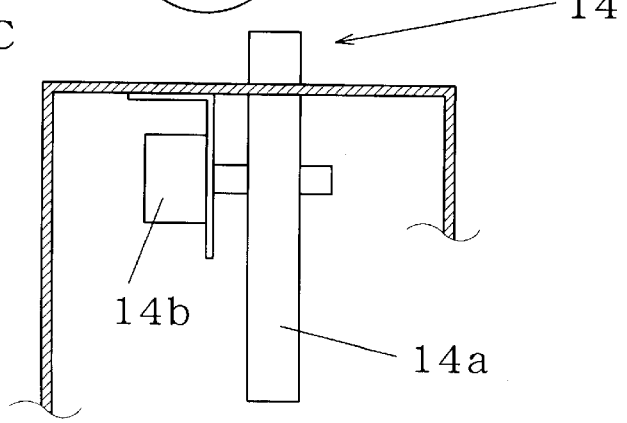
FIG. 2(c) is a cross-sectional view taken along the line A—A in FIG. 2(a)

Also, FIG. 2(a) is a disassembled view showing the relationship between the tip end portion 20b of the up and down moving arm 20 and the supporting section 10, FIG. 2(b) is a constructional view showing a turning angle detector for detecting a turning angle of the left and right operations of the head portion, and FIG. 2(c) is a sectional view taken along the line A—A in FIG. 2(a). In FIG. 2, 11 denotes an upper limb portion operating portion similar to that in FIG. 1, a head portion up and down operating portion 14 constitutes a head portion operating portion and instructs an up and down movement of the head portion. A cylindrical column 81 is erect on the tip end portion 20b, 81a denotes an inner cylindrical portion of the cylindrical column 81, and a threaded portion 82 is inserted into and fitted to the inner cylindrical portion 81a. 83 denotes a flat plate. A cover 84 is provided with a track ball 28, a change switch 40, a roller 14a of the head portion up and down operating portion 14, and a potentiometer (variable resistor) 14b. CNT is a coupling part by which the right upper limb portion operating portion is coupled to the left upper limb portion operating portion. A timing pulley 85 constitutes a turning angle detector. A potentiometer (variable resistor) 86 constitutes a turning angle detector. A timing belt 87 connects the timing pulley 85 to the variable resistor 86. The above-described flat plate 83, cover 84 and coupling part CNT constitute the supporting section 10. Further, the supporting section 10 and the turning angle detectors 85 and 86 constitute a head portion left and right operating portion 19 (described later) that carries out left and right movements of the head portion, and the roller 14a and the turning angle detector (potentiometer) 14b constitute a head portion up and down operating portion 14 that carries out up and down movements of the head portion.

A description is given of the operation and actions of the robot remote controlling apparatus thus constructed.

An operator usually sits on a chair and operates the upper limb portion operating portion 11 and the leg operating section 70. Operation data that is outputted from the upper limb portion operating portion 11 and data outputted from the head portion left and right operating portion are transmitted to a computer apparatus in the rack 30 via the supporting section and up and down moving arm 20. The up and down moving arm 20 is driven and turned to a position where the operator who sits on a chair can easily operate the upper limb portion operating portion 11. The up and down moving arm 20 is driven and moved up and down (that is, driven and rotated) by providing, for example, a rotation handle and transmitting the rotations of the rotation handle to the up and down moving arm 20 via a speed reducer mechanism. Operations of the respective operating portions, which are carried out by the operator, may be executed by displaying the operation data from the respective operating portions on the display 24, wherein the operations may be carried out by displaying, on the display 24, the image data picked up by a robot movement apparatus (which will be described later with reference to FIG. 9 and FIG. 10) that constitutes a robot apparatus A2. At this time, the operation data and image data can be changed by a change switch 40. The operation data in the head portion left and right operating portion is generated by the supporting section 10 whose threaded portion 82 is inserted into the inner cylindrical portion 81a rotating with respect to the cylindrical column 81, which is in a fixed state as has been understood in FIG. 2. That is, the turning angle with respect to the cylindrical column 81 is transmitted to the potentiometer 86 via the timing belt 87, and the same can be detected as a change in the resistance value. The track ball 28 can turn by itself, and can move a cursor on the display 24, whereby data is inputted.

Figure 3A:
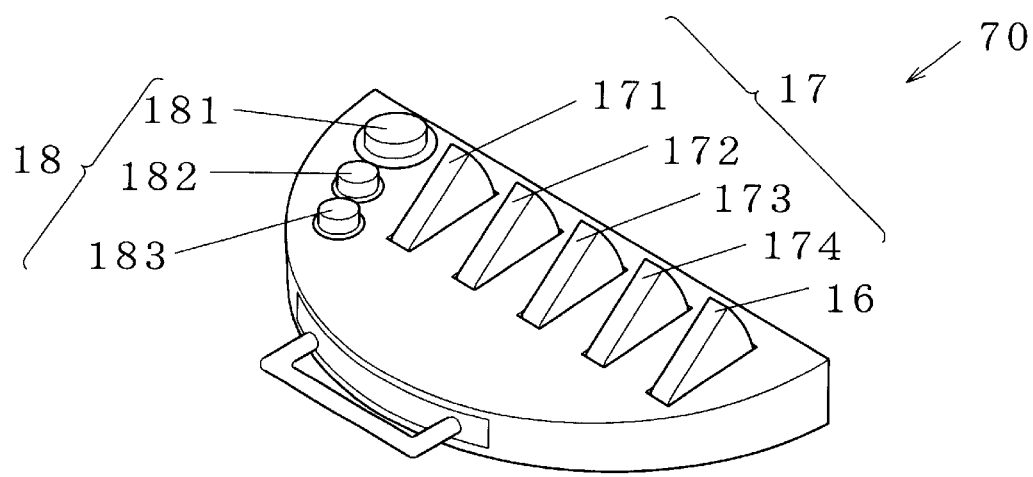
FIG. 3(a) is a perspective view showing a leg operating section.
Figure 3B:
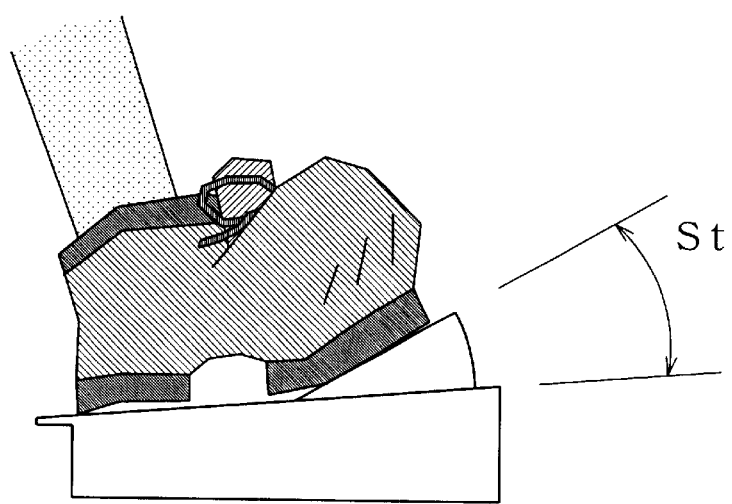
FIG. 3(b) is an explanatory view showing a stepping depth of a pedal.

FIG. 3(a) is a perspective view showing the leg operating section 70. In FIG. 3, 16 denotes a body portion forward bending pedal that acts as a body portion operating portion. 17 denotes a travel portion operating portion, 18 denotes a running operating portion, 171 denotes a motor backward pedal for leftward travel, 172 denotes a motor forward pedal for leftward travel, 173 denotes a motor backward pedal for rightward travel, and 174 denotes a motor forward pedal for rightward travel. 181 denotes a start ON/OFF pushbutton, 182 denotes a light ON pushbutton for lighting, and 183 denotes an emergency stop pushbutton. Further, FIG. 3(b) is a view explaining a stepping depth St of the pedals. If any one of the pedals 171 through 174 is stepped onto, the corresponding motor at the robot apparatus A2 side operates, and at the same time, the motor is caused to reach respective rotation speed, that is, travelling speed, which is proportional to the stepping depth St of the pedal 16. Also, the forward bending angle of the body portion of a robot is increased in proportion to the stepping depth St of the pedal 16. Further, the motor is repeatedly turned on and off alternately by pressing the pushbuttons 181 through 183.

Figure 4:
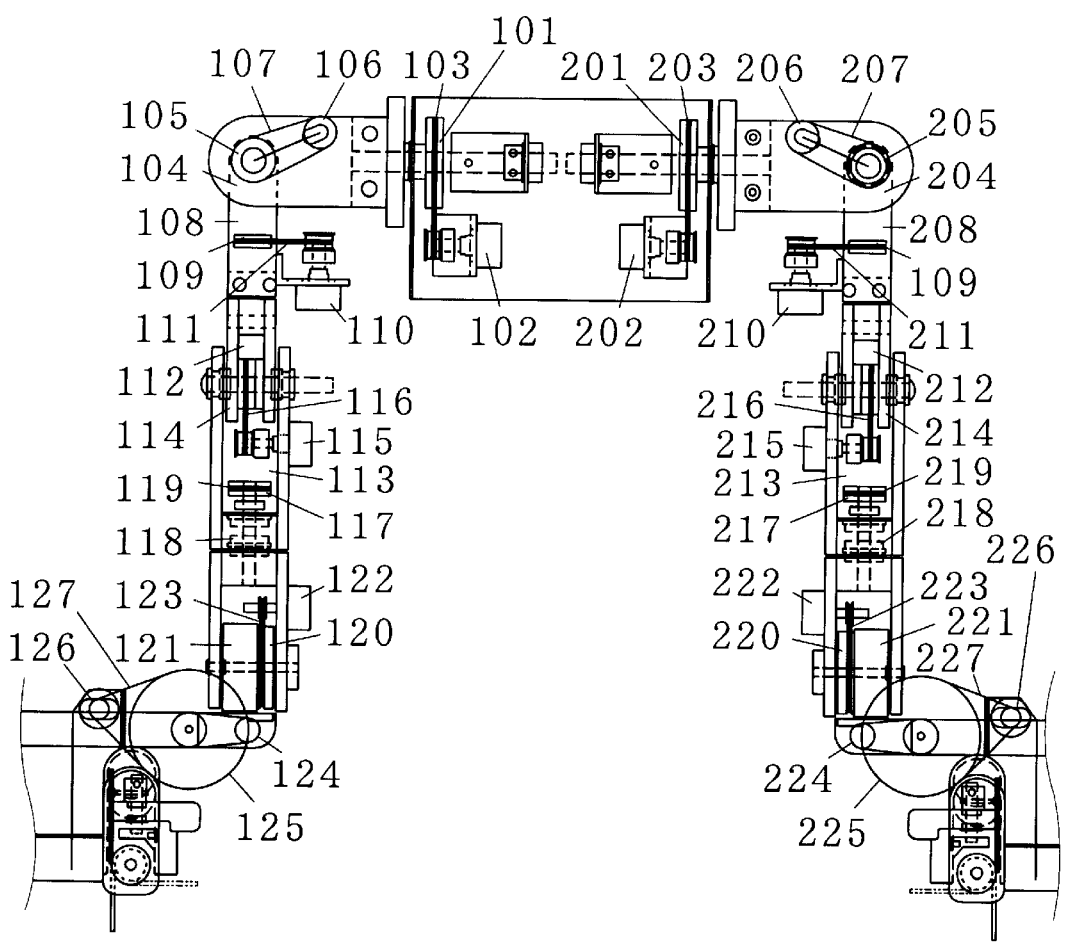
FIG. 4 is a front elevational view showing an upper limb portion operating portion of the robot remote controlling apparatus according to the first embodiment of the invention.
Figure 5:
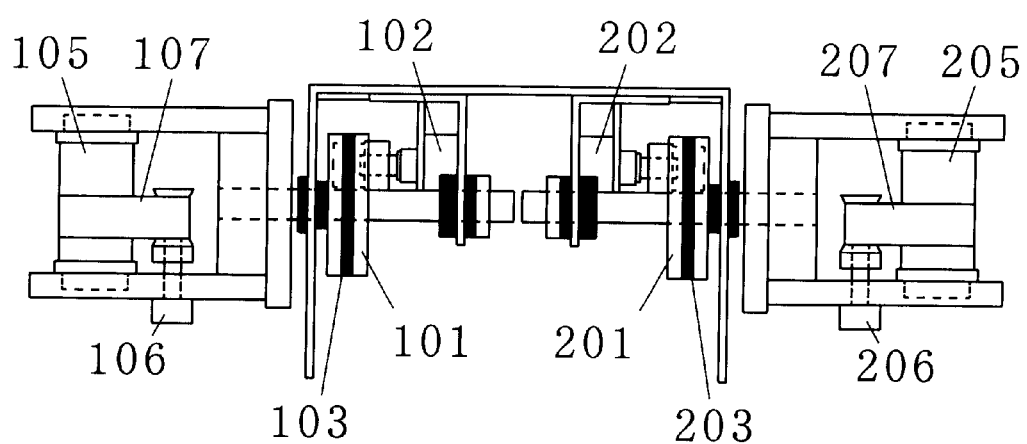
FIG. 5 is a plan view showing the upper limb portion operating portion.
Figure 6:
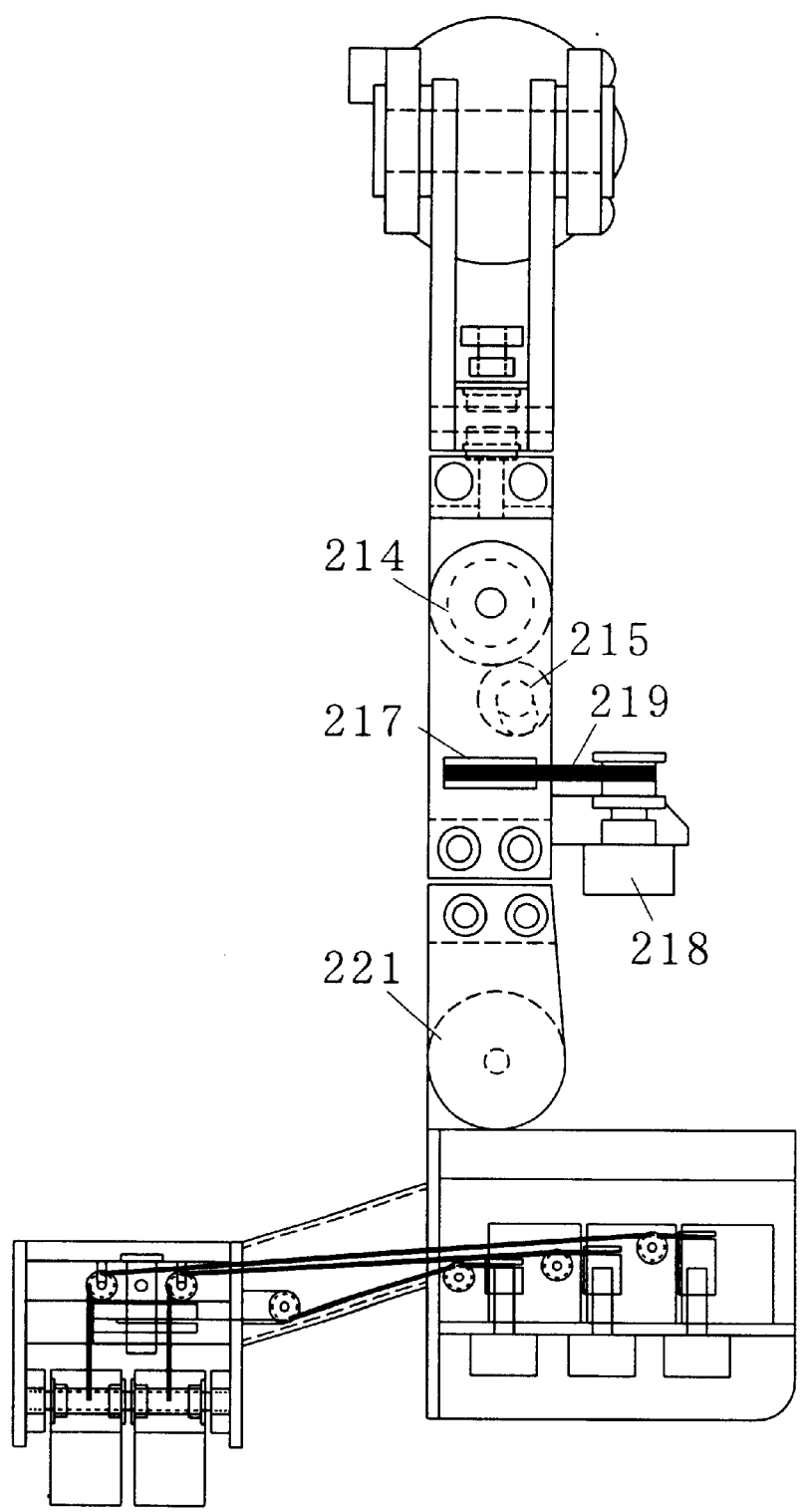
FIG. 6 is a right side view showing the upper limb portion operating portion.

FIG. 4 is a front elevational view showing an upper limb portion operating portion 11 of the robot remote controlling apparatus according to the first embodiment of the invention, FIG. 5 is a plan view showing the upper limb portion operating portion 11, and FIG. 6 is a right side view showing the upper limb portion operating portion 11.

In FIG. 4 through FIG. 6, 12 denotes an arm portion operating portion. 13 denotes a finger portion operating portion. CNT is a coupling part as in FIG. 2. 101 denotes a timing pulley. A potentiometer (shoulder forward and backward movement instructing portion) 102 detects a forward and backward turning angle of the right shoulder. 103 denotes a timing belt. 104 denotes a shoulder supporting member. 105 denotes a timing pulley. A potentiometer (shoulder left and right movement instructing portion) 106 detects a left and right turning angle of the right shoulder. 107 denotes a timing belt. 108 denotes an upper arm supporting member. 109 denotes a timing pulley. A potentiometer (upper limb instructing portion) 110 detects a left and right turning angle of the right upper arm. 111 denotes a timing belt. 112 denotes a first right elbow supporting member. 113 denotes a second right elbow supporting member. 114 denotes a timing pulley. A potentiometer (elbow instructing portion) 115 detects a forward and backward turning angle of the right elbow. 116 denotes a timing belt. 117 denotes a timing pulley. A potentiometer (front arm left and right movement instructing portion) 118 detects a left and right turning angle of the right front arm. 119 denotes a timing belt. 120 denotes a right front arm supporting member. 121 denotes a timing pulley. A potentiometer (wrist up and down movement instructing portion) 122 detects an up and down turning angle of the right wrist. 123 denotes a timing belt. 124 denotes a right wrist supporting member. 125 denotes a timing pulley. A potentiometer (wrist left and right movement instructing portion) 126 detects a left and right turning angle of the right wrist. And 127 denotes a timing belt.

Also, 201 denotes a timing pulley. A potentiometer (shoulder forward and backward movement instructing portion) 202 detects a forward and backward turning angle of the left shoulder. 203 denotes a timing belt. 204 denotes a shoulder supporting member. 205 denotes a timing pulley. A potentiometer (shoulder left and right movement instructing portion) 206 detects a left and right turning angle of the left shoulder. 207 denotes a timing belt. 208 denotes an upper arm supporting member. 209 denotes a timing pulley. A potentiometer (upper arm instructing portion) 210 detects a left and right turning angle of the left upper arm. 211 denotes a timing belt. 212 denotes a first left elbow supporting member. 213 denotes a second left elbow supporting member. 214 denotes a timing pulley. A potentiometer (elbow instructing portion) 215 detects a forward and backward turning angle of the left elbow. 216 denotes a timing belt. 217 denotes a timing pulley. A potentiometer (front arm left and right movement instructing portion) 218 detects a left and right turning angle of the left front arm. 219 denotes a timing belt. 220 denotes a left front arm supporting member. 221 denotes a timing pulley. A potentiometer (wrist up and down movement instructing portion) 222 detects an up and down turning angle of the left wrist. 223 denotes a timing belt. 224 denotes a left wrist supporting member. 225 denotes a timing pulley. A potentiometer (wrist left and right movement instructing portion) 226 detects a left and right turning angle of the left wrist. And, 227 denotes a timing belt.

Figure 7:
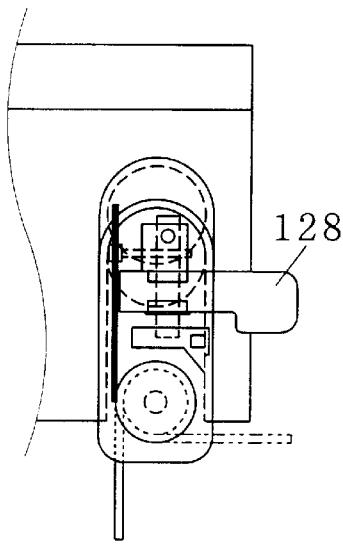
FIG. 7(a) is an enlarged view of the finger portion operating portion showing the finger portion operating portion of FIG. 4 and FIG. 6 in enlargement.
FIG. 7(b) is an enlarged view of the finger portion operating portion showing the finger portion operating portion of FIG. 4 and FIG. 6 in enlargement.
Figure 7:
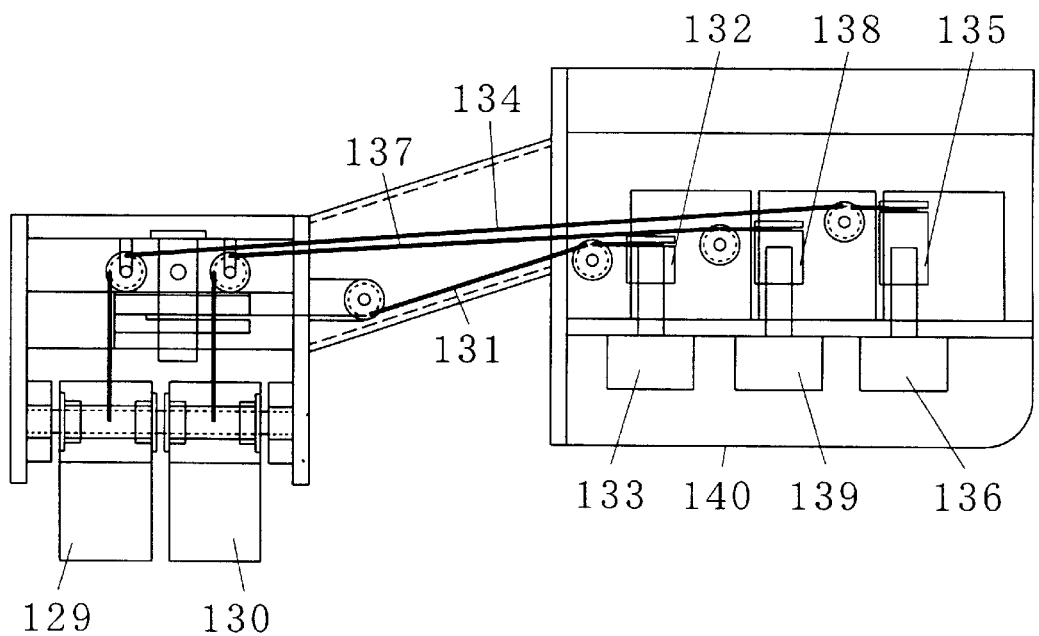
Figure 8:
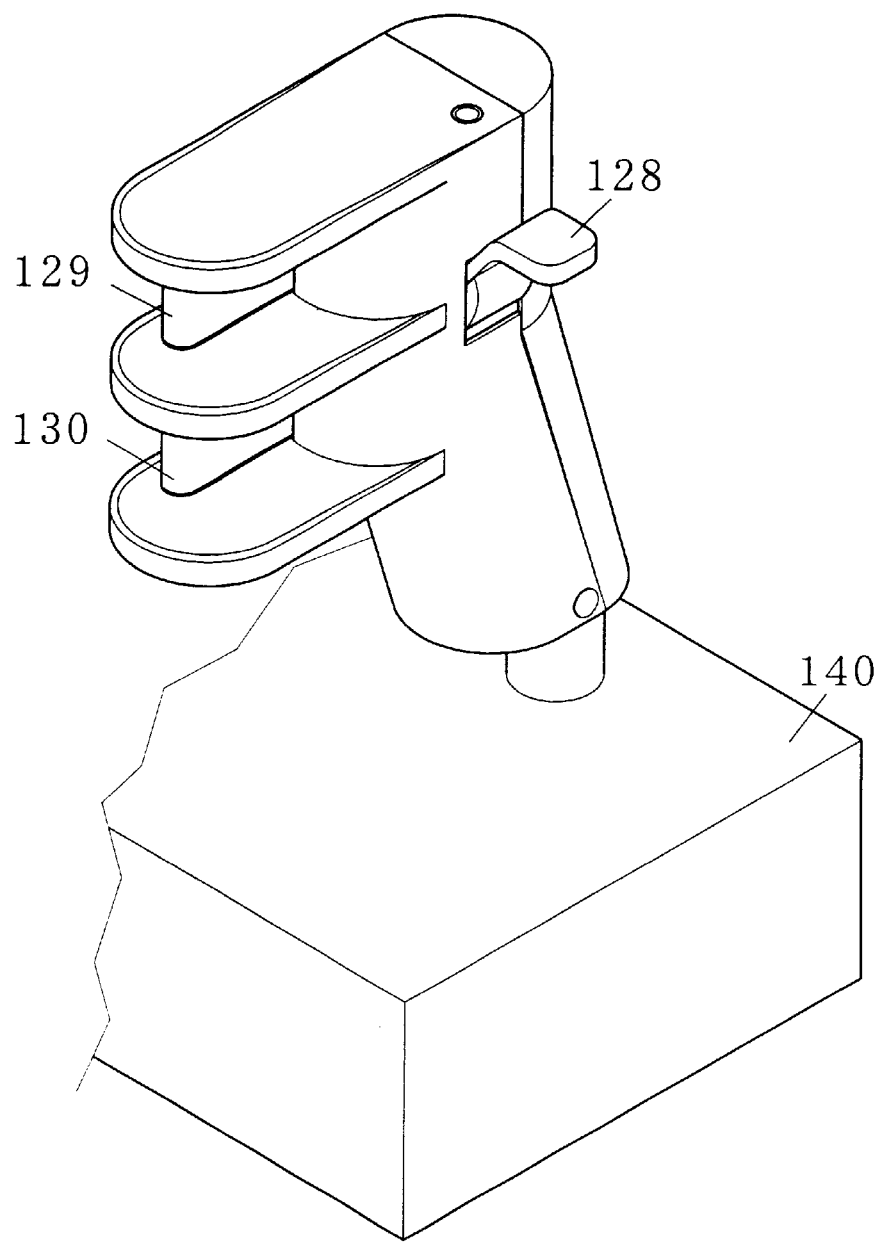
FIG. 8 is a rough perspective view showing the finger portion operating portion.

FIGS. 7(*a*) and (*b*) are enlarged views showing the finger portion operating portion by enlarging the finger portion operating portion 13 shown in FIG. 4 and FIG. 6. FIG. 8 is a rough perspective view of the finger portion operating portion 13.

In FIG. 7 and FIG. 8, a first finger portion 128 is pushed down by the thumb acting as the first finger. A second finger portion 129 is moved and turned by the forefinger acting as the second finger. A third finger portion 130 is moved and turned by the middle finger acting as the third finger. A timing belt 131 transmits up and down movements of the first finger portion 128 as rotational movements. A timing pulley 132 is driven by the timing belt 131. A potentiometer 133 is turned together with the timing pulley 132. A timing belt 134 transmits rotational movements of the second finger portion 129. A timing pulley 135 is driven by the timing belt 134. A potentiometer 136 is turned together with the timing pulley 135. A timing belt 137 transmits rotational movements of the third finger portion 130. A timing pulley 138 is driven by the timing belt 137. A potentiometer 139 is moved and turned together with the timing pulley 138. A casing 140 supports the finger portion.

Further, the respective timing pulleys and timing belts and potentiometers constitute a detecting portion.

The upper limb portion operating portion 11 constructed as described above is attached to the supporting portion 10 as shown in FIG. 1, and an operator sitting on a chair grasps the finger portion operating portion 13 by hand and is able to provide instructions for forward and backward or left and right movements for the shoulders, rotation of the upper arm, forward and backward movements of the elbow, rotation of the front arm, and up and down movements of the wrist. Also, the finger portion operating portion 13 provides instructions for movements of the first through the third fingers.

Figure 9:
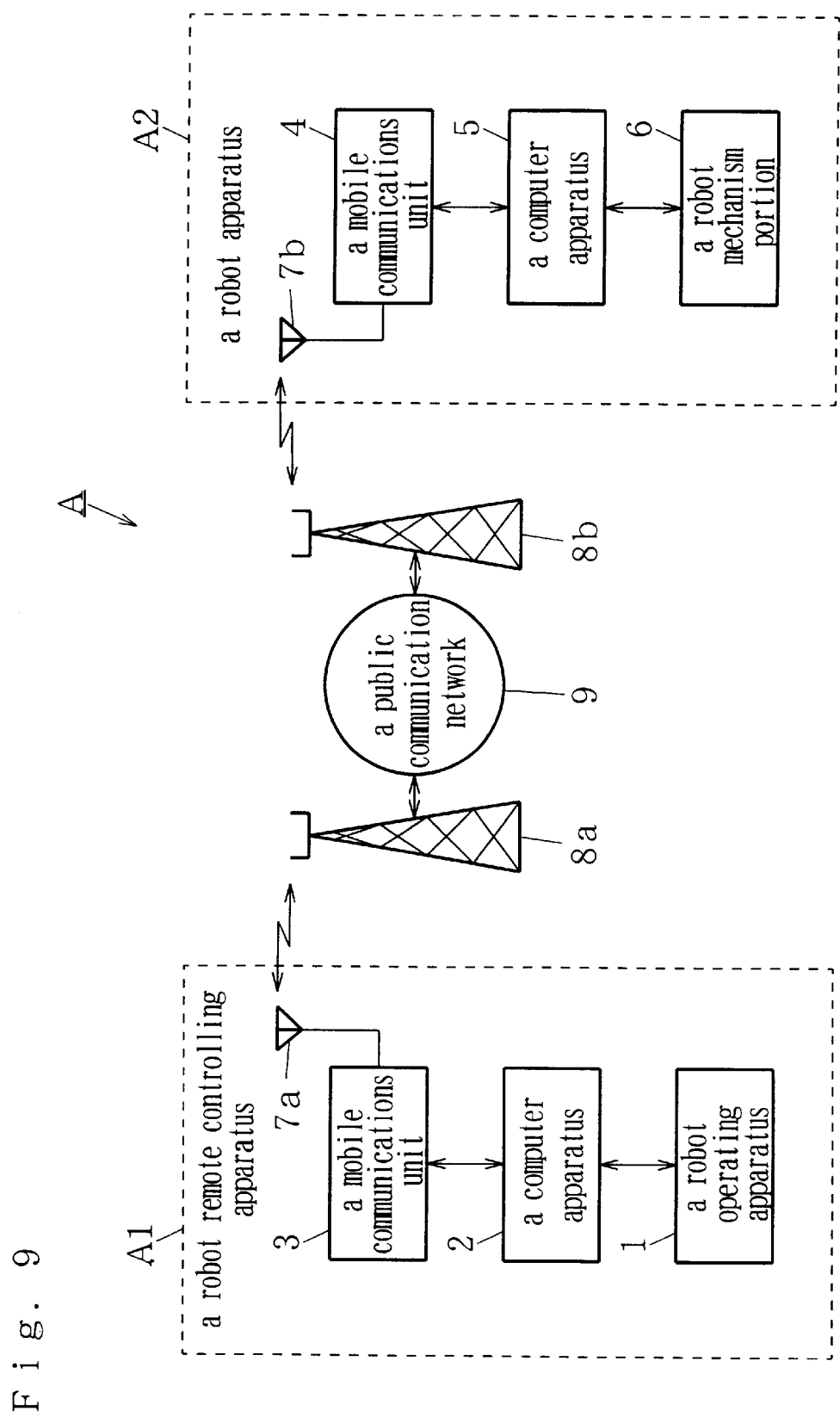
FIG. 9 is a block diagram showing a robot remote control system employing the robot remote controlling apparatus according to the first embodiment of the invention.

FIG. 9 is a block diagram showing a robot remote controlling system A employing a robot remote controlling apparatus according to the present embodiment.

In FIG. 9, A1 denotes a robot remote controlling apparatus, A2 denotes a robot apparatus that is remotely controlled by the robot remote controlling apparatus A1. 1 denotes a robot operating apparatus. 2 denotes a computer apparatus (the operation side computer apparatus). 3 denotes a mobile communications unit (the operation side mobile communications unit) such as a PHS unit. 4 also denotes a mobile communications unit (the robot side mobile communications unit) such as a PHS unit. 5 denotes a computer apparatus (the robot side computer apparatus). A robot mechanism portion 6 is provided with respective parts of a robot such as an arm portion, finger portion, etc. 7*a* and 7*b* denote antennas. 8*a* and 8*b* denote base stations. 9 denotes a public communication network.

A description is given of the operations of the robot remote controlling system that is constructed as described above.

Operation data that is outputted from the robot operating apparatus (for example, an upper limb portion operating portion 11) is inputted into the computer apparatus 2, and is processed in the form of transmission format and outputted to the mobile communications unit 3. The mobile communications unit 3 into which the operation data in the form of a transmission format is inputted transmits the same operation data to the mobile communications unit 4 via the antenna 7*a*, base station 8*a*, public communications network 9, base station 8*b* and antenna 7*b*. The mobile communications unit 4 that received operation data from the robot remote controlling apparatus Al outputs the received operation data to the computer apparatus 5, and the computer apparatus 5 processes the received operation data, wherein the operation of the robot mechanism portion 6 is controlled on the basis of the processed operation data.

Figure 10:
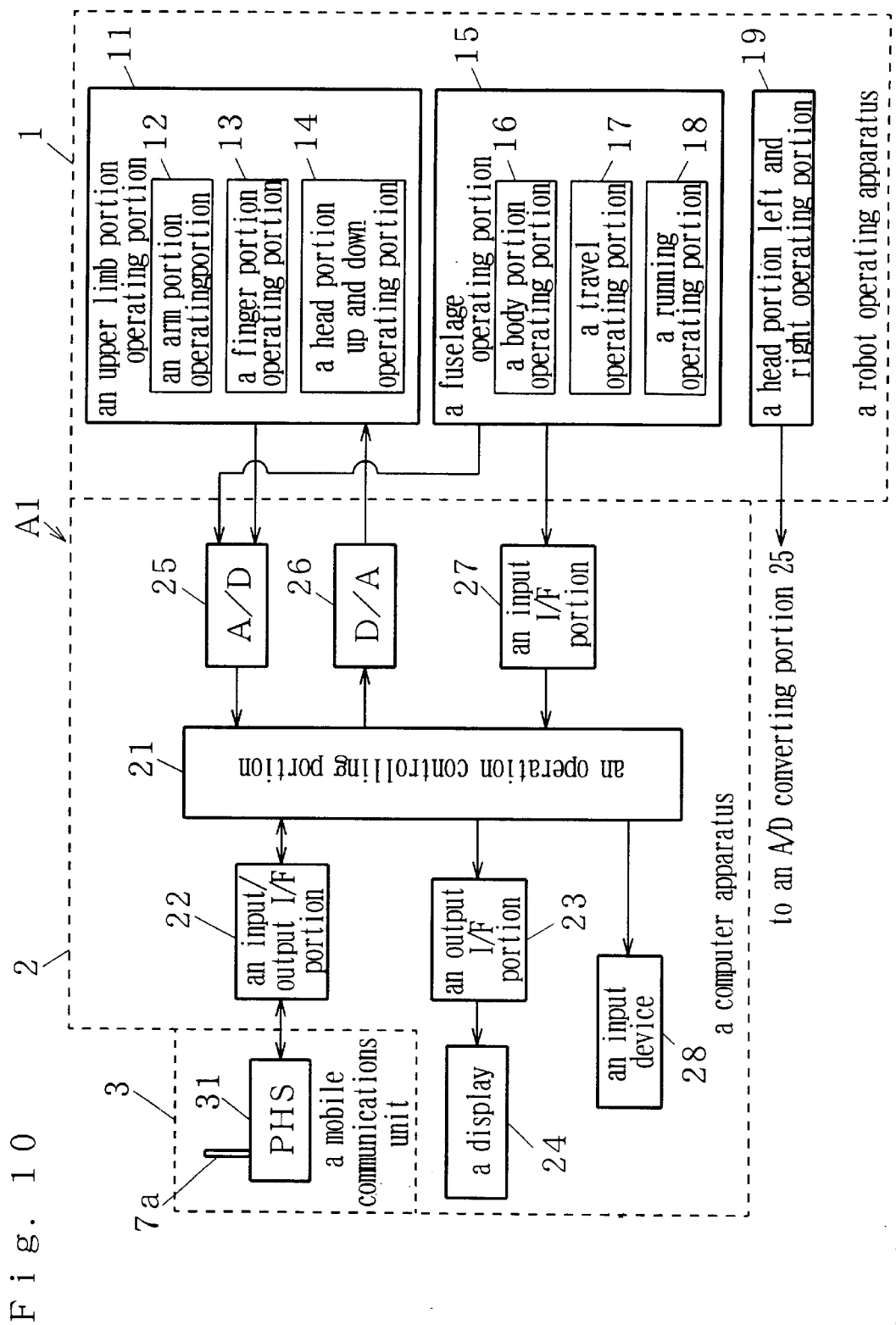
FIG. 10 is a block diagram showing details of the robot remote controlling apparatus.

FIG. 10 is a block diagram showing details of the robot remote controlling apparatus A1.

In FIG. 10, 1 denotes a robot operation apparatus as in FIG. 9. 2 denotes a computer apparatus as in FIG. 9. 3 denotes a mobile communications unit as in FIG. 9. 7*a* denotes an antenna as in FIG. 9. 11 denotes an upper limb portion operating portion as in FIG. 4 through FIG. 6. 12 denotes an arm portion operating portion as in FIG. 4. 13 denotes a finger portion operating portion as in FIG. 4. 14 denotes a head portion up and down operating portion as in FIG. 2. A fuselage operating portion 15 is disposed on the leg operating section 70 in FIG. 3. A body portion operating portion (body forward bending pedal) 16 constitutes the fuselage operating portion 15 as in FIG. 3. A travel operating portion (pedals 171 through 174 of the respective travel motors) 17 constitutes a fuselage operating portion 15 as in FIG. 3. A running operating portion 18 carries out running operations and is formed by pushbuttons as in FIG. 3. A head portion left and right operating portion 19 is disposed on the supporting section 10 shown in FIG. 1 and FIG. 2. An operation controlling portion 21 controls the entirety of the system by the computer apparatus 2. 22 denotes an input/output interface portion (input/output I/F portion). 23 denotes an output interface portion (Output I/F portion). 24 denotes a display as in FIG. 1. An A/D converting portion 25 converts analog operation signals, which are from the respective operating portions 12 through 14, to digital operation data. A D/A converting portion 26 converts digital operation data to analog operating signals and controls a finger reaction force at the finger portion operating portion 13. 27 denotes an input interface portion (Input I/F portion). 28 denotes an input device as in FIG. 1. 31 denotes a PHS unit that acts as a mobile communications unit as in FIG. 1(b).

A description is given of the use data with reference to the robot remote controlling apparatus A1 that is constructed as described above.

Table 1 below shows operating signals that are inputted into the operation controlling portion 21 via the input interface portion 27 of the computer apparatus 2, that is, operating signals from the fuselage operating portion 15.

TABLE 1

| Name of operation signals |
| --- |
| Emergency stop |
| Run |
| Light ON |
| Rightward travel motor FORWARD ON |
| Rightward travel motor BACKWARD ON |
| Leftward travel motor FORWARD ON |
| Leftward travel motor BACKWARD ON |
| Body portion UP and DOWN |

As shown in Table 1, operation signals showing the emergency stop, leftward and rightward or forward and backward of a drive wheel, and up and down movement of the body portion are inputted into the operation controlling portion 21. The emergency stop signal is generated by turning on an emergency stop pushbutton 183 of the leg operating section 70 in FIG. 3, for example. The emergency stop signal is inputted into the operation controlling portion 21 via the input interface portion 27, and is transmitted to the robot apparatus A2 via the input/output interface portion 22 and mobile communications unit 31. Also, a forward instruction of the right wheel is generated by stepping on the pedal 173 of the leg operating section 70, wherein a speed signal showing a speed responsive to the stepping depth is generated. Further, with reference to up and down operation of the body, an angle signal (angle signal of the body portion) showing an angle responsive to the stepping depth is generated. ON and OFF signals of the respective operation signals are inputted into the operation controlling portion 21 via the input interface portion 27, and are transmitted to the robot apparatus A2 shown in FIG. 9 via the input/output interface portion 22, mobile communications unit 31, and antenna 7a, wherein the drive wheel of the travel portion 73 is driven by the travel motor 65 of the robot apparatus A2 described later. A speed signal and angle signal (analog signal) of the respective operation signals are inputted into the operation controlling portion 21 via the A/D converting portion 25 and are transmitted to the robot apparatus A2 as well as the ON and OFF signals. Signals that are inputted via the A/D converting portion 25 are shown in Table 2 below.

TABLE 2

| Range of action | Name of operation signals |
| --- | --- |
| 180° | Head portion LEFT and RIGHT |
| 90° | Head portion UP and DOWN |
| 90° | Body portion ANGLE |
| 225° | Right shoulder FORWARD and BACKWARD |
| 225° | Left shoulder FORWARD and BACKWARD |
| 180° | Right shoulder LEFT and RIGHT |
| 180° | Left shoulder LEFT and RIGHT |
| 180° | Right upper arm LEFT and RIGHT (Turn) |
| 180° | Left upper arm LEFT and RIGHT (Turn) |
| 135° | Right elbow FORWARD and BACKWARD |
| 135° | Left elbow FORWARD and BACKWARD |
| 180° | Right front arm LEFT and RIGHT |
| 180° | Left front arm LEFT and RIGHT |
| 90° | Right wrist LEFT and RIGHT |
| 90° | Left wrist LEFT and RIGHT |
| 90° | Right wrist UP and DOWN |
| 90° | Left wrist UP and DOWN |
| | Right first finger OPEN and CLOSE |
| | Left first finger OPEN and CLOSE |
| | Right second finger OPEN and CLOSE |
| | Left second finger OPEN and CLOSE |
| | Right third finger OPEN and CLOSE |
| | Left third finger OPEN and CLOSE |
| | Right wheel SPEED |
| | Left wheel SPEED |

As shown in Table 2, operation signals of the head portion, operation signals of the arm portion, speed signals of the drive wheel, and angle signals of the body portion are inputted into the operation controlling portion 21 via the A/D converting portion 25. These signals are generated by an operator operating the arms and fingers, or operating the pedals of the leg operating section 70. The range of action shown in Table 2 means that a range of left and right movement, forward and backward movement or up and down movement is 90° in the case of 90°. Therefore, generally, it is meant that any moving part may move ±45° in any direction, for example, left and right direction, forward and backward direction and up and down direction. The respective signals are generated by the respective operating portions 12 through 14, 16, 17 and 19 and are inputted into the operation controlling portion 21 via the A/D converting portion 25. And, the signals are further inputted into the robot apparatus A2 via the input/output interface portion 22, mobile communications unit 31, and antenna 7a, wherein respective motors of the motor portion 62 of the robot actuating apparatus 6A are driven to actuate the head portion, arm portion, etc., of the robot.

Figure 11:
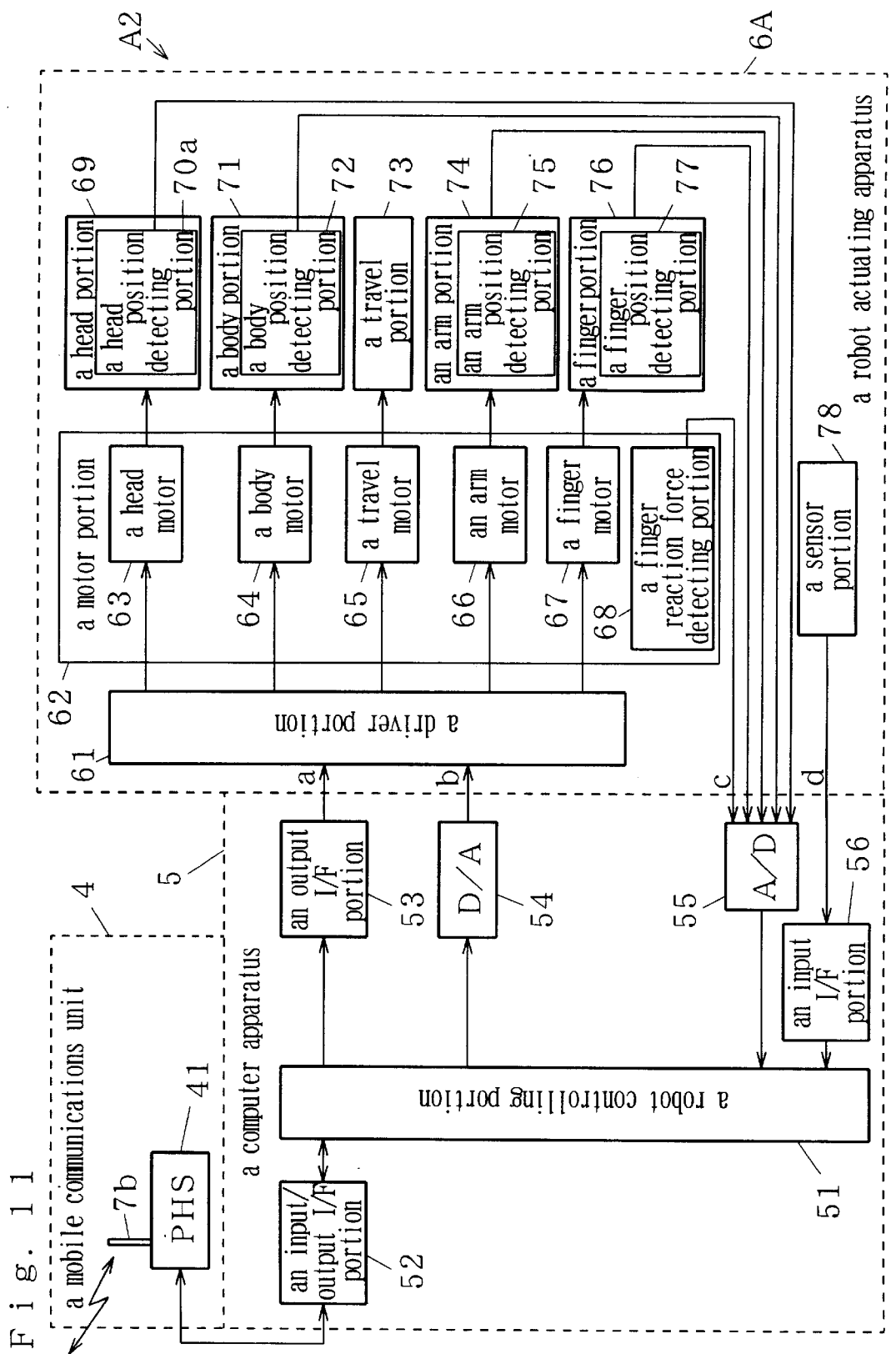
FIG. 11 is a block diagram showing details of the robot apparatus of FIG. 9.

FIG. 11 is a block diagram showing details of the robot apparatus A2 shown in FIG. 9.

In FIG. 11, 4 denotes a mobile communications unit as in FIG. 9. 5 denotes a computer apparatus as in FIG. 9. 6A denotes a robot actuating apparatus acting as the robot mechanism portion 6 (FIG. 9). A robot controlling portion 51 controls the entirety of the robot apparatus A2. An input/output I/F portion (input/output interface portion) 52 transmits and receives data between the same and the mobile communications unit 4. An output I/F portion (output interface portion) 53 outputs data a to the robot actuating apparatus 6A. A D/A converting portion 54 converts digital data to analog signals b and outputs the same to the robot actuating apparatus 6A. An A/D converting apparatus 55 converts analog signals c from the robot actuating apparatus 6A to digital data. An input I/F portion (input interface portion) 56 inputs data from the robot actuating apparatus 6A. A driver portion 61 inputs data a and b from the output interface portion 53 and the D/A converting portion 54 and generates a motor drive voltage. 62 denotes a motor portion.

A head motor 63 drives a head portion 69. A body motor 64 drives a body portion 71. A travel motor 65 drives a travel portion 73. An arm motor 66 drives an arm portion 74. A finger motor 67 drives a finger portion 76. A finger reaction force detecting portion 68 detects finger reaction forces that are generated at each of the first through third fingers. 70a denotes a head position detecting portion. 72 denotes a body position detecting portion. 75 denotes an arm position detecting portion. 77 denotes a finger position detecting portion. A sensor portion 78 detects respective physical amounts. Position signals c that are detected by the respective position detecting portions are inputted into the robot controlling portion 51 via the A/D converting portion 55 and are used as feedback signals. Also, sense signals d from the sensor portion 78 are inputted into the robot controlling portion 51 via the input interface portion 56.

A description is given of the use data (instruction signals) with reference to the robot apparatus A2 that is constructed as described above.

Table 3 below shows instruction signals corresponding to Table 1 and Table 2. These include an emergency stop signal, signals showing left and right or forward and backward movements of a drive wheel, and rotational directions (clockwise or counterclockwise) of the respective portion motors 63 through 67.

TABLE 3

| Name of instruction signals |
| --- |
| Emergency stop instruction |
| RUN instruction |
| Light ON |
| Head LEFT and RIGHT motor CW |
| Head LEFT and RIGHT motor CCW |
| Head UP and DOWN motor CW |
| Head UP and DOWN motor CCW |
| Body UP AND DOWN motor CW |
| Body UP AND DOWN motor CCW |
| Right shoulder FORWARD/BACKWARD motor CW |
| Right shoulder FORWARD/BACKWARD motor CCW |
| Left shoulder FORWARD/BACKWARD motor CW |
| Left shoulder FORWARD/BACKWARD motor CCW |
| Right shoulder LEFT and RIGHT motor CW |
| Right shoulder LEFT and RIGHT motor CCW |
| Left shoulder LEFT and RIGHT motor CW |
| Left shoulder LEFT and RIGHT motor CCW |
| Right upper arm LEFT and RIGHT motor CW |
| Right upper arm LEFT and RIGHT motor CCW |
| Left upper arm LEFT and RIGHT motor CW |
| Left upper arm LEFT and RIGHT motor CCW |
| Right elbow FORWARD/BACKWARD motor CW |
| Right elbow FORWARD/BACKWARD motor CCW |
| Left elbow FORWARD/BACKWARD motor CW |
| Left elbow FORWARD/BACKWARD motor CCW |
| Right front arm LEFT and RIGHT motor CW |
| Right front arm LEFT and RIGHT motor CCW |
| Left front arm LEFT and RIGHT motor CW |
| Left front arm LEFT and RIGHT motor CCW |
| Right wrist LEFT and RIGHT motor CW |
| Right wrist LEFT and RIGHT motor CCW |
| Left wrist LEFT and RIGHT motor CW |
| Left wrist LEFT and RIGHT motor CCW |
| Right wrist UP and DOWN motor CW |
| Right wrist UP and DOWN motor CCW |
| Left wrist UP and DOWN motor CW |
| Left wrist UP and DOWN motor CCW |
| Right first finger OPEN and CLOSE motor CW |
| Right first finger OPEN and CLOSE motor CCW |
| Left first finger OPEN and CLOSE motor CW |
| Left first finger OPEN and CLOSE motor CCW |
| Right second finger OPEN and CLOSE motor CW |
| Right second finger OPEN and CLOSE motor CCW |
| Left second finger OPEN and CLOSE motor CW |
| Left second finger OPEN and CLOSE motor CCW |

TABLE 3-continued

| Name of instruction signals |
| --- |
| Right third finger OPEN and CLOSE motor CW |
| Right third finger OPEN and CLOSE motor CCW |
| Left third finger OPEN and CLOSE motor CW |
| Left third finger OPEN and CLOSE motor CCW |
| Right travel motor CW |
| Right travel motor CCW |
| Left travel motor CW |
| Left travel motor CCW |

These signals are outputted from the robot controlling portion 51 to the driver portion 61 via the output interface portion 53, and drive the respective motors 63 through 67 of the motor portion 62.

Table 4 below shows signals that are inputted from respective position detecting portions 70a, 72, 75 and 77 of the robot actuating portion 6A via the A/D converting portion 55.

TABLE 4

| Range of action | Name of detection signals |
| --- | --- |
| 180° | Head portion LEFT and RIGHT axial position |
| 90° | Head portion UP and DOWN axial position |
| 90° | Body portion UP and DOWN |
| 225° | Right shoulder FORWARD and BACKWARD |
| 225° | Left shoulder FORWARD and BACKWARD |
| 180° | Right shoulder LEFT and RIGHT |
| 180° | Left shoulder LEFT and RIGHT |
| 180° | Right upper arm LEFT and RIGHT |
| 180° | Left upper arm LEFT and RIGHT |
| 135° | Right elbow FORWARD and BACKWARD |
| 135° | Left elbow FORWARD and BACKWARD |
| 180° | Right front arm LEFT and RIGHT |
| 180° | Left front arm LEFT and RIGHT |
| 90° | Right wrist LEFT and RIGHT |
| 90° | Left wrist LEFT and RIGHT |
| 90° | Right wrist UP AND DOWN |
| 90° | Left wrist UP AND DOWN |
|  | Right first finger OPEN and CLOSE |
|  | Left first finger OPEN and CLOSE |
|  | Right second finger OPEN and CLOSE |
|  | Left second finger OPEN and CLOSE |
|  | Right third finger OPEN and CLOSE |
|  | Left third finger OPEN and CLOSE |
|  | Right first finger REACTION force |
|  | Left first finger REACTION force |
|  | Right second finger REACTION force |
|  | Left second finger REACTION force |
|  | Right third finger REACTION force |
|  | Left third finger REACTION force |

The signals shown in Table 4 are feedback signals (signals used for position feedback control) showing the detected positions of the head portion and arm portion, and finger reaction force signals that are transmitted to the remote controlling apparatus A1. The range of action shown in Table 4 indicates a range of left and right movement, forward and backward movement or up and down movement is 90° in the case of 90°. Therefore, generally, it is meant that any moving part may move ±45° in any direction, for example, left and right direction, forward and backward direction and up and down direction.

Figure 12:
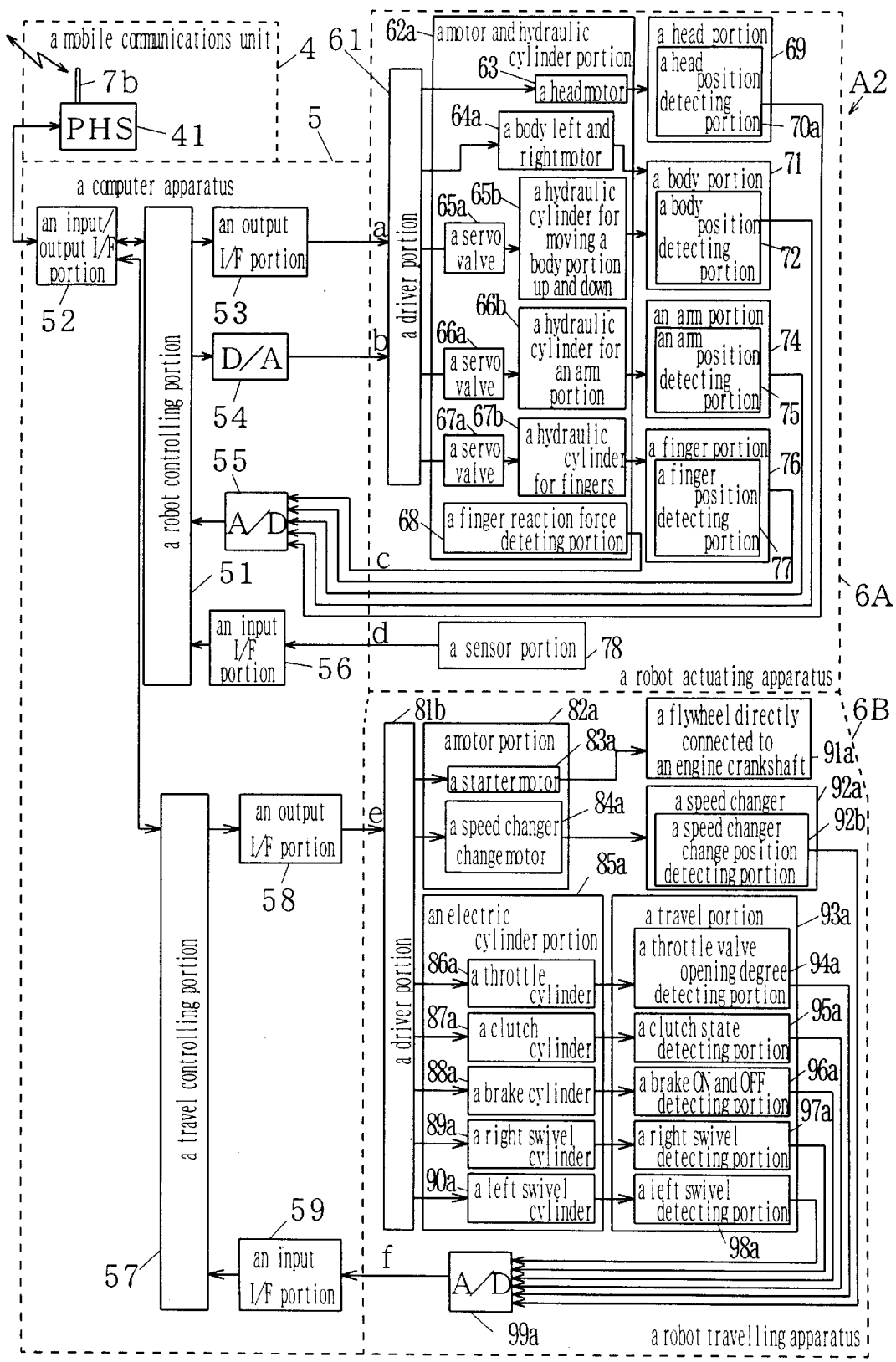
FIG. 12 is a block diagram showing details of another example of the robot apparatus of FIG. 9.

FIG. 12 shows a block diagram showing details of another example of the robot apparatus A2 shown in FIG. 9.

In FIG. 12, a mobile communications unit 4, computer apparatus 5, robot actuating apparatus 6A, robot controlling portion 51, input/output I/F portion (Input/output interface portion) 52, output I/F portion (Output interface portion) 53, D/A converting portion 54, A/D converting portion 55, input I/F portion (Input interface portion) 56, driver portion 61, head motor 63, finger reaction force detecting portion 68, head position detecting portion 70a, body position detecting portion 72, arm position detecting portion 75, finger position detecting portion 77 and sensor portion 78 are similar to those in FIG. 11. These portions are given the same reference numbers, and description thereof is omitted herein. A robot travelling apparatus 6B constitutes a robot mechanism portion 6 along with the robot actuating apparatus 6A. 62a denotes a motor and hydraulic cylinder portion. A body left and right motor 64a drives the body portion 71 in the left and right direction. A servo valve 65a drives a hydraulic cylinder 65b for moving the body portion up and down, which can actuates the body portion 71 in the up and down direction. A servo valve 66a drives a hydraulic cylinder 66b for the arm portion, which can actuate the arm portion 74. And a servo valve 67a drives a hydraulic cylinder 67b for fingers, which can actuate the finger portion 76.

Also, in FIG. 12, a travel controlling portion 57 controls a travel portion 93a of the robot apparatus A2. An output I/F portion (Output interface portion) 58 outputs data e to the robot travelling apparatus 6B. An input I/F portion (Input interface portion) 59 inputs data f that is from the robot travelling apparatus 6B. A driver portion 81b inputs the data e that is from the output interface portion 58 and generates a drive voltage of a motor portion 82a and an electric cylinder portion 85a. A starter motor 83a drives a flywheel 91a directly connected to a crankshaft of an engine (not illustrated) and starts the engine. A speed changer change motor 84a changes the speed changing position of the speed changer 92a. A throttle cylinder 86a controls the opening degree of a throttle valve (not illustrated) of the travel portion 93a. A clutch cylinder 87a controls engagement and disengagement of a clutch (not illustrated) of the travel portion 93a. A brake cylinder 88a controls ON and OFF of a brake of the travelling portion 93a. A right swivel cylinder 89a swivels the travel portion 93a in the right direction. A left swivel cylinder 90a swivels the travel portion 93a in the left direction. A speed changer change position detecting portion 92b detects a change position of the speed changer 92a. A throttle valve opening degree detecting portion 94a detects the opening degree of the throttle valve. A clutch state detecting portion 95a detects the state of the clutch. A brake ON and OFF detecting portion 96a detects ON and OFF of the brake. A right swivel detecting portion 97a detects rightward swivel of the travel portion 93a. A left swivel detecting portion 98a detects leftward swivel of the travel portion 93a. An A/D converting portion 99a converts analog signals, which are from the respective detecting portions 92b, 94a through 98a of the robot travel apparatus, to digital data f.

A description is given of the use data (instruction signals) with respect to the robot apparatus A2 that has been constructed as described above.

Table 5 below shows instruction signals corresponding to Table 1 and Table 2. These instruction signals include an emergency stop signal, signals showing left and right movements or forward and backward movements of a drive wheel, signals showing CW and CCW of the respective portion motors, and signals showing flow directions and flow amounts of the respective servo valves.

TABLE 5

Name of instruction signals

Body portion direction control signal UP and DOWN
Body portion flow amount control signal
Right shoulder direction control signal FORWARD and BACKWARD
Right shoulder flow amount control signal
Left shoulder direction control signal FORWARD and BACKWARD
Left shoulder flow amount control signal
Right shoulder direction control signal LEFT and RIGHT
Right shoulder flow amount control signal
Left shoulder direction control signal LEFT and RIGHT
Left shoulder flow amount control signal
Right upper arm direction control signal LEFT and RIGHT
Right upper arm flow amount control signal
Left upper arm direction control signal LEFT and RIGHT
Left upper arm flow amount control signal
Right elbow direction control signal FORWARD and BACKWARD
Right elbow flow amount control signal
Left elbow direction control signal FORWARD and BACKWARD
Left elbow flow amount control signal
Right elbow direction control signal LEFT and RIGHT
Right elbow flow amount control signal
Left elbow direction control signal LEFT and RIGHT
Left elbow flow amount control signal
Right wrist direction control signal LEFT and RIGHT
Right wrist flow amount control signal
Left wrist direction control signal LEFT and RIGHT
Left wrist flow amount control signal
Right wrist direction control signal UP and DOWN
Right wrist flow amount control signal
Left wrist direction control signal UP and DOWN
Left wrist flow amount control signal
Right first finger direction control signal OPEN and CLOSE
Right first finger flow amount control signal
Left first finger direction control signal OPEN and CLOSE
Left first finger flow amount control signal
Right second finger direction control signal OPEN and CLOSE
Right second finger flow amount control signal
Left second finger direction control signal OPEN and CLOSE
Left second finger flow amount control signal
Right third finger direction control signal OPEN and CLOSE
Right third finger flow amount control signal
Left third finger direction control signal OPEN and CLOSE
Left third finger flow amount control signal
Right first finger direction control signal SLIDE
Right first finger flow amount control signal
Left first finger direction control signal SLIDE
Left first finger flow amount control signal
Throttle motor START
Throttle motor CW and CCW
Brake motor START
Brake motor CW and CCW
Clutch motor START
Clutch motor CW and CCW
Right swivel motor START
Right swivel motor CW and CCW
Left swivel motor START
Left swivel motor CW and CCW
Gear Y direction motor START
Gear Y direction motor CW and CCW
Gear X direction motor START
Gear X direction motor CW and CCW
Head LEFT and RIGHT motor START
Head LEFT and RIGHT motor CW and CCW
Head UP and DOWN motor START
Head UP and DOWN motor CW and CCW
Body LEFT and RIGHT motor START
Body LEFT and RIGHT motor CW and CCW These signals are outputted from the robot control portion 51 and the travel controlling portion 57 to the driver portions 61 and 81b via the output interface portions 53 and 58. These signals drive the respective motors 63 and 64a of the motor/hydraulic cylinder portion 62a, and the respective hydraulic cylinders 65b, 66b, and 67b thereof and further drive the respective motors 83a and 84a of the motor portion 82a and the respective cylinders 86a through 90a of the electric cylinder portion 85a. Also, in Table 5, X and Y direction signals of gears are those that show change positions of the speed changer 92a.

Table 6 below shows signals that are inputted from respective position detecting portions 70a, 72, 75, and 77 of the robot actuating apparatus 6A via the A/D converting portion 55, and those that are inputted from the respective detecting portions 92b, 94a through 98a of the robot travelling apparatus via the A/D converting portion 99a.

TABLE 6

| Range of actions | Name of detection signals |
| --- | --- |
| 180° | Head LEFT and RIGHT Axial position |
| 90° | Head UP and DOWN Axial position |
| 90° | Body Up and DOWN |
| 225° | Right shoulder FORWARD and BACKWARD |
| 225° | Left shoulder FORWARD and BACKWARD |
| 180° | Right shoulder LEFT and RIGHT |
| 180° | Left shoulder LEFT and RIGHT |
| 180° | Right upper arm LEFT and RIGHT |
| 180° | Left upper arm LEFT and RIGHT |
| 135° | Right elbow FORWARD and BACKWARD |
| 135° | Left elbow FORWARD and BACKWARD |
| 180° | Right front arm LEFT and RIGHT |
| 180° | Left front arm LEFT and RIGHT |
| 90° | Right wrist LEFT and RIGHT |
| 90° | Left wrist LEFT and RIGHT |
| 90° | Right wrist UP and DOWN |
| 90° | Left wrist UP and DOWN |
|  | Right first finger OPEN and CLOSE |
|  | Left first finger OPEN and CLOSE |
|  | Right second finger OPEN and CLOSE |
|  | Left second finger OPEN and CLOSE |
|  | Right third finger OPEN and CLOSE |
|  | Left third finger OPEN and CLOSE |
|  | Right first finger REACTION FORCE |
|  | Left first finger REACTION FORCE |
|  | Right second finger REACTION FORCE |
|  | Left second finger REACTION FORCE |
|  | Right third finger REACTION FORCE |
|  | Left third finger REACTION FORCE |
|  | Throttle valve opening degree |
|  | Clutch ENGAGE and DISENGAGE |
|  | Brake ON and OFF |
|  | Right swivel ON and OFF |
|  | Left swivel ON and OFF |

The signals shown in Table 6 are those showing the throttle valve opening degree, etc., in addition to those shown in Table 4.

Figure 13:
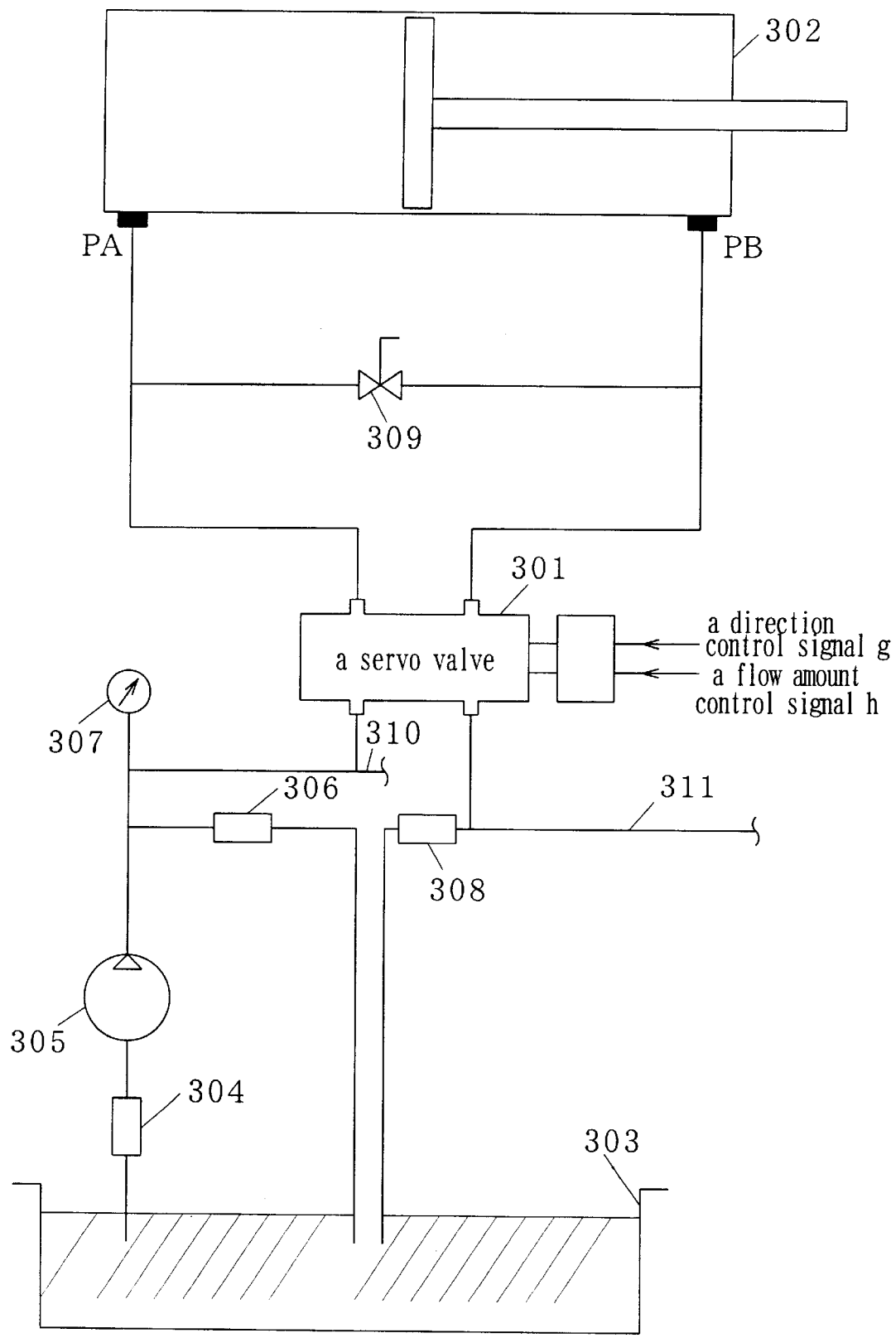
FIG. 13 is a circuit diagram showing hydraulic circuits consisting of servo valves and hydraulic cylinders, etc., which are driven by the driver portion.

FIG. 13 is a circuit diagram showing a hydraulic circuit that is composed of a servo valve, hydraulic cylinder, etc. which are driven by the driver portion 61 shown in FIG. 12.

In FIG. 13, a servo valve 301 is driven by the driver portion 61. A hydraulic cylinder 302 is driven by the servo valve 301 via ports PA and PB. 303 denotes a water tank. A strainer 304 filtrates water that is sucked from the water tank 303. A pump 305 discharges water. A relief valve 306 keeps the discharge pressure in a power line 310 fixed (constant). A pressure gauge 307 shows a discharge pressure. A relief valve 308 makes the return side water pressure fixed in a reverse line 311. And a manual valve 309 enables manual operation of the hydraulic cylinder 302.

A direction control signal g indicating a CW or CCW direction and a flow amount control signal h indicating the flow amount are inputted into the servo valve 301 in FIG. 13. If the direction control signal g shows a normal direction CW, the port PA is connected to the discharge side, and the port PB is connected to the return side, wherein a piston of the hydraulic cylinder 302 moves at the flow amount (that is, the piston moving speed) shown by the flow amount control signal h. If the direction control signal g shows a reverse direction CCW, the port PB is connected to the discharge side, and the port PA is connected to the return side. Thus, the moving direction and moving speed of the piston of the hydraulic cylinder 302 are determined.

As described above, where the present embodiment is provided with a rack 30 that accommodates the computer apparatus 2 excluding the display 24 and input device 28 and incorporates the display 24; the up and down moving arm 20 that is rotatably disposed on the rack 30 and whose tip end portion 20b can move up and down; a supporting section 10 that is rotatably disposed on the tip end portion 20b and detects a turning angle with respect to the tip end portion 20b as the head left and right turning angle, detects a turning angle of the roller 14a disposed on the upper surface as the head up and down turning angle, and has the input device 28 disposed at the front side thereof and the left and right upper limb portion operating portions 11 disposed on the left and right sides; and an independent casing-shaped leg operating section 70 in which the fuselage operating portion 15 is disposed, the upper limb portion operating portion 11 having the finger portion operating portion 13 and the arm portion operating portion 12 is disposed on the supporting section 10. Therefore, it is not necessary for the upper limb portion operating portion 11 to be carried by the shoulders, wherein the upper limb portion operating portion 11 can be made small in size and light in weight, and its operation can be easily and comfortably executed.

Also, by turning the supporting section 10, that is, turning the upper limb portion operating portion 11, which is disposed on the supporting section 10, it becomes possible to easily carry out left and right operations of the head portion. Further, by turning the roller 14a on the upper surface of the supporting section 10, it is possible to easily carry out up and down operations of the head portion. Still further, since the fuselage operating portion 15 that carries out the body operations and travelling operations is disposed as an independent operating portion (that is, the leg operating section 70), the body operations and travelling operations can be carried out independently from the upper limb portion operating portion 11 and the head portion left and right operating portion 19, for example, by operating the legs, wherein it is possible to easily and comfortably carry out the body operations and the travelling operations. Also, since the display 24 is disposed on the rack 30 and the input device 28 is disposed on the supporting section 10, it is possible to easily carry out visual checks by the display 24 and input operations.

Further, the left and right arm portion operating portions 12 are, respectively, provided with shoulder forward and backward movement instructing portions 102 and 202 for instructing forward and backward movements of the shoulder, shoulder left and right movement instructing portions 106 and 206 for instructing left and right movements of the shoulder, upper arm instructing portions 110 and 210 for instructing rotations of the upper arm, elbow instructing portions 115 and 215 for instructing bending and stretching operations of the elbow, front arm left and right movement instructing portions 118 and 218 for instructing left and right movements of the front arm, and wrist up and down movement instructing portions 122 and 222 for instructing up and down movements of the wrist, the left and right finger portion operating portions 13 are, respectively, provided with wrist left and right movement instructing portions 126 and 226 for instructing left and right movements of the wrist, the first, second and third finger instructing portions for instructing bending and stretching movements of the first, second and third fingers, and the head portion operating portion is provided with the head up and down movement instructing portion 14b for instructing up and down movements of the head portion, and the head left and right movement instructing portion 86 for instructing left and right movements of the head portion. Therefore, based on operation data that is generated at the respective instructing portions of the arm portion operating portion 12, finger portion operating portion 13, head portion up and down operating portion 14, and head portion left and right operating portion 19, movement instructions are provided to the robot apparatus.

Still further, the left and right arm portion operating portions 12 are, respectively, provided with shoulder forward and backward movement detecting portions 101 through 103 and 201 through 203 for detecting forward and backward movements of the shoulder, shoulder left and right movement detecting portions 105 through 107 and 205 through 207 for detecting left and right movements of the shoulder, upper arm detecting portions 109 through 111 and 209 through 211 for detecting rotations of the upper arm, elbow detecting portions 114 through 116 and 214 through 216 for detecting bending and stretching movements of the elbow, front arm left and right movement detecting portions 117 through 119 and 217 and 219 for detecting left and right movements of the front arm, and wrist up and down movement detecting portions 121 through 123 and 221 through 223 for detecting up and down movements of the wrist. And, the left and right finger portion operating portions 13 are, respectively, provided with wrist left and right movement detecting portions 125 through 127 and 225 through 227 for detecting left and right movements of the wrist, and the first, second and third finger detecting portions 128 through 139 for detecting bending and stretching movements of the first, second and third fingers. Also, the head portion operating portion is provided with head up and down movement detecting portions 14a and 14b for detecting up and down movements of the head portion and the head left and right movement detecting portions 10, 85 through 87 for detecting left and right movements of the head portion. Therefore, since the respective amounts of operations can be accurately detected by the respective instructing portions, the detected data can be transmitted to the robot apparatus as the operation data, wherein the robot apparatus can be accurately controlled.

Further, since the respective detecting portions are provided with a pulley and a timing belt, which can transmit forward and backward, left and right and turning movements as turning actions, and a variable resistor for detecting the turning actions, the respective operating amounts can be accurately transmitted to the variable resistor, wherein accurate operation data can be generated.

In addition, since the supporting section 10 is provided with the change switch 40 for changing data, which is inputted into the display 24, it is possible to change the contents of the display 24 to, for example, operation data and image data.

Also, the robot remote controlling apparatus A1 is composed of the robot operating apparatus 1 for operating respective parts of a robot, the operation side computer apparatus 2 for processing data on the basis of the operation data from the robot operating apparatus 1, and the operation side mobile communications unit 3 for transmitting data, which is processed by the computer apparatus 2, via wireless circuits. The robot apparatus A2 receives the transmission data from the robot remote controlling apparatus A1 via the base stations 8a and 8b and a public communications network 9 and drives the respective parts of the robot. The robot apparatus A2 is provided with the robot side mobile communications apparatus 4 that receives the transmission data from the operation side mobile communications unit 3, the robot side computer apparatus 5 for processing the data received by the robot side mobile communications unit 4 and outputting operation data, and the robot mechanism portion 6 having the respective parts of the robot, which are controlled on the basis of the operation data outputted from the robot side computer apparatus 5. Therefore, the robot mechanism portion 6 can be easily remotely controlled on the basis of the operation data from the robot side computer apparatus 5.

Further, since the robot mechanism portion 6 is provided with motors 63 through 67 that are driven on the basis of the operation data outputted from the robot side computer apparatus 5, and respective parts 69, 71, 73, 74 and 76 of the robot, which are driven by the motors 63 through 67, the respective parts 69, 71, 73 74, and 76 of the robot of the robot mechanism portion 6 can be driven by small-sized and simplified motors, and the robot apparatus A2 itself can be simplified in structure.

Still further, the respective parts of the robot are the head portion 69, body portion 71, travel portion 73, arm portion 74 and finger portion 76, wherein the robot apparatus A2 itself can be made simple in structure, and at the same time, it becomes possible to handle various types of goods for various uses.

In addition, the robot mechanism portion 6 is provided with motors 63, 64a, and 84a that are driven on the basis of operation data outputted from the robot side computer apparatus 5, servo valves 65a through 67a, electric cylinder portion 85a and starter motor 83a, and respective parts 69, 71, 74, 76, 91a, 92a and 93a of the robot, which are driven by motors 63, 64a, 84a, servo valves 65a through 67a and electric cylinder portion 85a. Therefore, the robot apparatus A2 itself can be made simple in structure, and at the same time, it becomes possible to handle various types of goods for various uses.

Further, the respective parts of the robot are the head portion 69, body portion 71 for left and right movements, speed changer 92a, which are driven by the motors, the body portion 71 for up and down movements, arm portion 74 and finger portion 76, which are driven by the hydraulic cylinders 65b through 67b via the servo valves 65a through 67a, the throttle valve of the engine, clutch, brake and left and right swivel portions, which are driven by the electric cylinders 86a through 90a, and the flywheel 91a directly connected to the engine crankshaft, which is driven by the starter motor 83a. Therefore, the robot apparatus A2 itself can be made simple in structure, and at the same time, it becomes possible to handle various types of goods for various uses. Still further, a sufficient force (torque) and number of revolutions can be displayed since travelling is effected by an engine.

According to a robot remote controlling apparatus described in the first aspect of the invention, the robot remote controlling apparatus has a robot operating apparatus including an upper limb portion operating portion for carrying out finger operations and arm operations, a fuselage operating portion for carrying out body operations, travel portion operations, and running operations, and a head portion operating portion for carrying out head operations; a computer apparatus including a display for displaying data, an input device for inputting data, and an operation controlling portion for processing data on the basis of operation data from the robot operating apparatus; and a mobile communications device for transmitting data, which is processed by the computer apparatus, via wireless circuits; and the same comprises: a rack that accommodates the computer apparatus excluding the display and the input device, and at the same time, that mounts the display; an up and down moving arm that is rotatably disposed on the rack and whose tip end portion can move up and down; a supporting section rotatably disposed on the tip end portion, which detects a turning angle with respect to the tip end portion as a left and right turning angle of a head portion, and detects a turning angle of a roller disposed on the upper surface thereof as an up and down turning angle of the head portion, and in which the input device is disposed at the front side thereof, and the left and right upper limb portion operating portions are disposed at the left and right sides thereof; and an independent box-shaped leg operating section on which the fuselage operating portion is disposed. Therefore, since the upper limb portion operating portion having the finger portion operating portion, arm portion operating portion, and head portion up and down operating portion is disposed on the supporting section, it is not necessary for the upper limb portion operating portion to be carried by the shoulders of an operator, wherein such an advantageous effect can be brought about, by which the upper limb portion operating portion can be made small in size and light in weight, and the operation can be easily and comfortably carried out. Also, by turning the supporting section, that is, turning the upper limb portion operating portion disposed on the supporting section, it becomes possible to easily operate the head portion leftward or rightward. Also, since the fuselage operating portion that carries out operations of the body portion and the travel portion is disposed as a leg operating section independently from the supporting section and the rack, the operations of the body portion and the travel portion can be carried out by, for example, leg operations, independently from the upper limb portion operating portion and the head portion left and right operating portion, wherein such an advantageous effect can be brought about, by which operations of the body portion and the travel portion can be easily and comfortably carried out. Still further, since the display is disposed on a rack, and the input device is disposed on the supporting section, wherein such an advantageous effect can be brought about, by which it is possible to carry out visual checks of the display and input operations.

According to the robot remote controlling apparatus described in the second aspect of the invention, in addition to the robot remote controlling apparatus described in the first aspect, the left and right arm portion operating portions, respectively, include a shoulder forward and backward movement instructing portion for instructing forward and backward movements of a shoulder; a shoulder left and right movement instructing portion for instructing left and right movements of the shoulder; an upper arm instructing portion for instructing rotations of the upper arm, an elbow instructing portion for instructing bending and stretching movements of an elbow; a front arm left and right movement instructing portion for instructing left and right movements of a front arm; and a wrist up and down movement instructing portion for instructing up and down movements of a wrist; left and right finger portion instructing portions respectively include a wrist left and right movement instructing portion for instructing left and right movements of the wrist; first, second and third finger portion instructing portions for instructing bending and stretching movements of the first, second and third fingers, and the head portion operating portion includes a head up and down movement instructing portion for instructing up and down movements of the head portion; and a head left and right movement instructing portion for instructing left and right movements of the head portion. Therefore, such an advantageous effect can be brought about, by which, on the basis of operation data that is generated at the arm portion operating portion, finger portion operating portion and at the respective instructing portions such as the head up and down movement instructing portion and head left and right movement instructing portion, movement instructions can be provided to the robot apparatus.

According to the robot remote controlling apparatus described in the third aspect of the invention, in addition to the robot remote controlling apparatus described in the first or second aspect, the left and right arm portion operating portions, respectively, include a shoulder forward and backward movement detecting portion for detecting forward and backward movements of a shoulder; a shoulder left and right movement detecting portion for detecting left and right movements of the shoulder; an upper arm detecting portion for detecting rotations of the upper arm, an elbow detecting portion for detecting bending and stretching movements of an elbow; a front arm left and right movement detecting portion for detecting left and right movements of a front arm; and a wrist up and down movement detecting portion for detecting up and down movements of a wrist; the left and right finger portion operating portions, respectively, include a wrist left and right movement detecting portion for detecting left and right movements of the wrist; first, second and third finger detecting portions for detecting bending and stretching movements of the first, second and third fingers, and the head portion operating portion includes a head up and down movement detecting portion for detecting up and down movements of the head portion; and a head left and right movement detecting portion for detecting left and right movements of the head portion. Therefore, such an advantageous effect can be brought about, by which since the respective amounts of operations can be accurately detected by the respective instructing portions, the detected data is transmitted to the robot apparatus as the operation data, and the robot apparatus can be accurately controlled.

According to the robot remote controlling apparatus described in the fourth aspect of the invention, in addition to the robot remote controlling apparatus described in the third aspect, the respective detecting portions include pulleys and timing belts that transmit forward and backward, left and right and turning movements as turning actions, and variable resistors for detecting the turning actions. Therefore, such an advantageous effect can be brought about, by which the respective amounts of operations can be accurately transmitted to the variable resistor, and it is possible to generate accurate operation data.

According to the robot remote controlling apparatus described in the fifth aspect of the invention, in addition to the robot remote controlling apparatus described in any one of the first aspect through the fourth aspect, the supporting section is provided with a change switch for changing data which is inputted into the display. Therefore, such an advantageous effect can be brought about, by which the contents of the display can be changed to, for example, operation data and image data.

According to a robot apparatus described in the sixth aspect of the invention, a robot apparatus for driving respective parts of the robot upon receiving, via a base station and a public communications network, the transmission data from the robot remote controlling apparatus that is composed of a robot operating apparatus for operating the respective parts of the robot, an operation side computer apparatus that processes data on the basis of operation data from the robot operating apparatus, and an operation side mobile communications unit for transmitting data, which is processed by the computer apparatus, via a wireless circuit; comprises a robot side mobile communications unit for receiving transmission data from the operation side mobile communications unit; a robot side computer apparatus for processing data, which is received by the robot side mobile communications unit, and outputting the operation data; and a robot mechanism portion including respective parts of the robot that are controlled on the basis of the operation data outputted from the robot side computer apparatus. Accordingly, such an advantageous effect can be brought about, by which it is possible to easily remotely control the robot mechanism portion on the basis of operation data from the robot side computer apparatus.

According to the robot apparatus described in the seventh aspect of the invention, in addition to the robot apparatus described in the sixth aspect, the robot mechanism portion includes a motor that is driven on the basis of operation data which is outputted from the robot side computer apparatus, and respective parts of the robot that are driven by the motor. Accordingly, such an advantageous effect can be brought about, by which since the respective parts of the robot of the robot mechanism portion can be driven by small-sized and simplified motors, the robot apparatus itself can be made small-sized and simplified in structure.

According to the robot apparatus described in the eighth aspect of the invention, in addition to the robot apparatus described in the seventh aspect, the respective parts of the robot are a head portion, a body portion, a travel portion, an arm portion and a finger portion. Therefore, such an advantageous effect can be brought about, by which the robot apparatus itself can be simplified in structure, and at the same time, it is possible to handle various types of goods for various uses.

According to the robot apparatus described in the ninth aspect of the invention, in addition to the robot apparatus described in the eighth aspect, the robot mechanism portion includes a motor, a servo valve, an electric cylinder portion, and a starter motor, which are driven on the basis of operation data outputted from the robot side computer apparatus, and respective parts of the robot, which are driven by the motors, the servo valve, the electric cylinder portion. Accordingly, such an advantageous effect can be brought about, by which the robot apparatus itself can be made simplified in structure, and at the same time, it is possible to handle various types of goods for various uses.

According to the robot apparatus described in the tenth aspect of the invention, in addition to the robot apparatus described in the ninth aspect, the respective parts of the robot are a head portion, a body portion for left and right movements, a speed changer, which are driven by the motors, a body portion for up and down movements, an arm portion, a finger portion, which are driven by a hydraulic cylinder via the servo valve, a throttle valve of an engine, a clutch, a brake, and a left and right swiveling portion, which are driven by the electric cylinder, and a flywheel directly connected to an engine crankshaft, which is driven by the starter motor. Accordingly, such an advantageous effect can be brought about, by which the robot apparatus itself can be simplified in structure, it is possible to handle various types of goods for various uses, and at the same time a sufficient force (torque) and number of revolutions can be displayed since travelling is effected by an engine. Still further, such another advantageous effect can be brought about, by which since the respective parts of the robot are driven by water pressure (hydraulically) and no oil pressure is used, the danger of fire can be excluded even if the hydraulic pressure tube is broken, and if water is colored, it is possible to easily locate the breakage point.

What is claimed is:

1. A robot remote controlling apparatus having:

a robot operating apparatus including an upper limb operating portion having finger operating portions for carrying out finger operations and arm operating portions for carrying out arm operations, a fuselage operating portion for carrying out body operations, travel operations, and running operations, and a head operating portion for carrying out head operations;

a computer apparatus including a display for displaying data, an input device for inputting data, and an operation controlling portion for processing data on the basis of operation data from said robot operating apparatus; and a mobile communications device for transmitting data, which is processed by said computer apparatus, via wireless circuits; and wherein said arm operating portions at the left and right sides, respectively, comprise:
      a shoulder forward and backward movement instructing portion for instructing forward and backward movements of the shoulder;
      a shoulder left and right movement instructing portion for instructing left and right movements of the shoulder;
      an upper arm instructing portion for instructing rotations of the upper arm;
      an elbow instructing portion for instructing bending and stretching movements of an elbow;
      a front arm left and right movement instructing portion for instructing left and right movements of a front arm; and
      a wrist up and down movement instructing portion for instructing up and down movements of a wrist;

wherein said finger operating portions at the left and right sides, respectfully, comprise:
      a wrist left and right movement instructing portion for instructing left and right movements of the wrist; and
      first, second and third finger portion instructing portions for instructing bending and stretching movements of the first, second and third fingers;

and wherein said head operating portion comprises:
      a head up and down movement instructing portion for instructing up and down movements of the head portion; and
      a head left and right movement instructing portion for instructing left and right movements of the head portion; and said robot remote controlling apparatus comprising:
      a rack that accommodates said computer apparatus excluding said display and said input device, and at the same time, that mounts said display;
      an up and down moving arm that is rotatably disposed on said rack and whose tip end portion can move up and down;
      a supporting section rotatably disposed on said tip end portion, which detects a turning angle with respect to said tip end portion as a left and right turning angle of a head portion, and detects a turning angle of a roller disposed on the upper surface thereof as an up and down turning angle of the head portion, and in which said input device is disposed at the front side thereof, and said upper limb operating portions at the left and right sides are disposed at the left and right sides thereof; and an independent box-shaped leg operating section on which said fuselage operating portion is disposed.

2. The robot remote controlling apparatus as set forth in claim 1, wherein said arm operating portions at the left and right sides, respectively, comprise:

a shoulder forward and backward movement detecting portion for detecting forward and backward movements of the shoulder; and a shoulder left and right movement detecting portion for detecting left and right movements of the shoulder;

wherein said arm operating portions comprise:

an upper arm detecting portion for detecting rotations of the upper arm;

an elbow detecting portion for detecting bending and stretching movements of an elbow;

a front arm left and right movement detecting portion for detecting left and right movements of a front arm; and a wrist up and down movement detecting portion for detecting up and down movements of a wrist;

wherein said finger operating portions comprise:

a wrist left and right movement detecting portion for detecting left and right movements of the wrist; and first, second, and third finger portion detecting portions for detecting bending and stretching movements of the first, second and third fingers;

and wherein said head operating portion comprises:

a head up and down movement detecting portion for detecting up and down movements of the head portion; and a head left and right movement detecting portion for detecting left and right movements of the head portion.

3. The robot remote controlling apparatus as set forth in claim 2, wherein said respective detecting portions comprise:

pulleys and timing belts that transmit forward and backward, left and right and turning movements as turning actions; and variable resistors for detecting said turning actions.

4. The robot remote controlling apparatus as set forth in any one of claims 1, 2 and 3, wherein said supporting section further comprises:

a change switch for changing data which is inputted into said display.

5. A robot apparatus for driving respective parts of said robot upon receiving, via a base station and a public communications network, transmission data from a robot remote controlling apparatus comprising a robot operating apparatus for operating respective parts of said robot, an operation side computer apparatus that processes data on the basis of operation data from said robot operating apparatus, and an operation side mobile communications unit for transmitting data, which is processed by said computer apparatus, via a wireless circuit, said robot apparatus comprising:

a robot side mobile communications unit for receiving transmission data from said operation side mobile communications unit;

a robot side computer apparatus for processing data, which is received by said robot side mobile communications unit, and outputting said operation data; and a robot mechanism portion, including the respective parts of said robot, controlled on the basis of said operation data outputted from said robot side computer apparatus, said robot mechanism portion being driven at least partially by a motor, a servo valve, and an electric cylinder portion.

6. The robot apparatus as set forth in claim 5, wherein the motor is driven on the basis of operation data which is outputted from said robot side computer apparatus.

7. The robot apparatus as set forth in claim 6, wherein the respective parts of said robot comprise: a head portion, a body portion, a travel portion, an arm portion, and a finger portion.

8. The robot apparatus as set forth in claim 7, wherein the servo valve, the electric cylinder portion, and the motor are driven on the basis of operation data outputted from said robot side computer apparatus.

9. The robot apparatus as set forth in claim 8, wherein the respective parts of said robot comprise:

a head portion, a body portion for left and right movements, and a speed changer, which are driven by said motor;

a body portion for up and down movements, an arm portion, and a finger portion, which are driven by a hydraulic cylinder via said servo valve;

a throttle valve of an engine, a clutch, a brake, and a left and right swiveling portion, which are driven by said electric cylinder; and a flywheel directly connected to an engine crankshaft, which is driven by another motor comprising a starter motor.

* * * * *